US011958290B2

(12) United States Patent
Maeda

(10) Patent No.: US 11,958,290 B2
(45) Date of Patent: Apr. 16, 2024

(54) DROPLET DISCHARGING APPARATUS, HEAD CONTROL METHOD, AND HEAD CONTROLLER

(71) Applicant: Brother Kogyo Kabushiki Kaisha, Nagoya (JP)

(72) Inventor: Atsushi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 138 days.

(21) Appl. No.: 17/693,677

(22) Filed: Mar. 14, 2022

(65) Prior Publication Data

US 2022/0314615 A1 Oct. 6, 2022

(30) Foreign Application Priority Data

Mar. 30, 2021 (JP) ................................ 2021-058225

(51) Int. Cl.
*B41J 2/045* (2006.01)
*B41J 2/14* (2006.01)
*B41J 2/175* (2006.01)

(52) U.S. Cl.
CPC ....... *B41J 2/04581* (2013.01); *B41J 2/04588* (2013.01); *B41J 2/14201* (2013.01); *B41J 2/17596* (2013.01)

(58) Field of Classification Search
CPC ......................... B41J 2/04581; B41J 2/04588; B41J 2/14201; B41J 2/17596; B41J 2/04508;

(Continued)

(56) References Cited

U.S. PATENT DOCUMENTS

2007/0146403 A1 6/2007 Sayama et al.
2007/0177169 A1 8/2007 Han (Continued)

FOREIGN PATENT DOCUMENTS

JP S58-88469 U 6/1983
JP 2001-054947 A 2/2001

(Continued)

OTHER PUBLICATIONS

Mar. 14, 2022—Co-pending U.S. Appl. No. 17/693,614.

(Continued)

*Primary Examiner* — Kristal Feggins
(74) *Attorney, Agent, or Firm* — Banner & Witcoff, Ltd.

(57) ABSTRACT

There is provided droplet discharging apparatus including: nozzle configured to discharge liquid by energy generating element; first signal generator configured to generate, based on first and second data representing first and second driving waveforms, first time division multiplex signal; first separator configured to separate first or second driving waveform signal representing the first or second driving waveform from the first time division multiplex signal; second signal generator configured to generate, based on third and fourth data representing third and fourth driving waveforms, second time division multiplex signal; and second separator configured to separate third or fourth driving waveform signal representing the third or fourth driving waveform from the second time division multiplex signal. The energy generating element is driven by the first or second driving waveform signal separated by the first separator, or by the third or fourth driving waveform signal separated by the second separator.

11 Claims, 19 Drawing Sheets

(58) Field of Classification Search
CPC .......................... B41J 2/04546; B41J 2/04541; B41J 2/04573; B41J 2/0459; B41J 2/04591; B41J 2/04596; B41J 2/04595; B41J 2/04593; B41J 2/04516; B41J 2/04525; B41J 2/04535
See application file for complete search history.

(56) References Cited

U.S. PATENT DOCUMENTS

| | | | | |
|---|---|---|---|---|
| 2008/0122888 | A1 | 5/2008 | Suzuki | |
| 2013/0083106 | A1* | 4/2013 | Tsukamoto | B41J 2/04596 347/10 |
| 2018/0201012 | A1* | 7/2018 | Miyagishi | B41J 2/04588 |
| 2019/0126611 | A1 | 5/2019 | Lahiri et al. | |
| 2021/0060935 | A1* | 3/2021 | Kashimura | B41J 2/04581 |

FOREIGN PATENT DOCUMENTS

| | | | |
|---|---|---|---|
| JP | 2008-126612 | A | 6/2008 |
| JP | 2010-064465 | A | 3/2010 |
| JP | 2010-142978 | A | 7/2010 |
| JP | 2019-512413 | A | 5/2019 |

OTHER PUBLICATIONS

Jul. 22, 2022—(EP) Extended EP Search Report—EP App. 22155761.4.

Nov. 24, 2023—(US)—Non-final Office Action—U.S. Appl. No. 17/693,614.

Jan. 9, 2024—(JP) Notice of Reasons for Refusal—JP App 2021-143754, Eng Tran.

* cited by examiner

DRIVING WAVEFORM G

DRIVING WAVEFORM H

DRIVING WAVEFORM I

DRIVING WAVEFORM A1

DRIVING WAVEFORM B1

DRIVING WAVEFORM C1

TIME SERIES DATA

ANALOG SIGNAL

THIRD TIME DIVISION MULTIPLEX SIGNAL

DROPLET DISCHARGING APPARATUS, HEAD CONTROL METHOD, AND HEAD CONTROLLER

CROSS REFERENCE TO RELATED APPLICATIONS

The present application claims priority from Japanese Patent Application No. 2021-058225, filed on Mar. 30, 2021, the disclosure of which is incorporated herein by reference in its entirety.

BACKGROUND

The present technique relates to a droplet discharging apparatus configured to discharge (eject, jet) droplets from a nozzle, a head control method, and a head controller.

A printer is known, which generates first to fourth driving pulses having different amplitudes, as driving signals for driving a piezoelectric element of a nozzle. The first to fourth driving pulses are continuously generated during one cycle for printing one pixel. One of the first to fourth driving pulses is selected and applied to the piezoelectric element of each of the nozzles. The nozzle jets an ink in an amount corresponding to the amplitude of the selected driving pulse to form a dot having a desired size.

SUMMARY

A droplet discharging apparatus according to an aspect of the present disclosure includes a nozzle, a first signal generator, a first separator, a second signal generator and a second separator.

The nozzle is configured to discharge a liquid by an energy generating element.

The first signal generator is configured to generate, based on at least first data representing a first driving waveform and second data representing a second driving waveform different from the first driving waveform, a first time division multiplex signal in which a third portion being a part of the second driving waveform is aligned between a first portion being a part of the first driving waveform and a second portion being other part of the first driving waveform, and the second portion is aligned between the third portion and a fourth portion being other part of the second driving waveform, the first time division multiplex signal being capable of transmitting the first data and the second data via a first signal line being single signal line.

The first separator is configured to separate a first driving waveform signal representing the first driving waveform or a second driving waveform signal representing the second driving waveform from the first time division multiplex signal generated by the first signal generator.

The second signal generator is configured to generate, based on at least third data representing a third driving waveform and fourth data representing a fourth driving waveform different from the third driving waveform, a second time division multiplex signal in which a seventh portion being a part of the fourth driving waveform is aligned between a fifth portion being a part of the third driving waveform and a sixth portion being other part of the third driving waveform, and the sixth portion is aligned between the seventh portion and an eighth portion being other part of the fourth driving waveform, the second time division multiplex signal being capable of transmitting the third data and the fourth data via a second signal line being single signal line.

The second separator is configured to separate a third driving waveform signal representing the third driving waveform or a fourth driving waveform signal representing the fourth driving waveform from the second time division multiplex signal generated by the second signal generator.

The energy generating element is driven by the first driving waveform signal or the second driving waveform signal separated by the first separator, or the energy generating element is driven by the third driving waveform signal or the fourth driving waveform signal separated by the second separator.

The waveform of the first time division multiplex signal and a waveform of the second time division multiplex signal are different from each other.

A head control method for a head having a first nozzle and a second nozzle according to another aspect of the present disclosure, includes the following.

Reading, from a first memory, a plurality of first data values which is quantized and which is included in first data representing a first driving waveform and a plurality of second data values which is quantized and which is included in second data representing a second driving waveform different from the first driving waveform, and outputting first time division multiplex data in which the first data values and the second data values read from the first memory are aligned in time series, to a first digital-analog converter.

Converting the first time division multiplex data into an analog signal to generate a first time division multiplex signal, and outputting the first time division multiplex signal to a first switch and a second switch corresponding to the first nozzle.

Reading, from a second memory, a plurality of third data values which is quantized and which is included in third data representing a third driving waveform and a plurality of fourth data values which is quantized and which is included in fourth data representing a fourth driving waveform different from the third driving waveform, and outputting second time division multiplex data in which the third data values and the fourth data values read from the second memory are aligned in time series, to a second digital-analog converter.

Converting the second time division multiplex data into an analog signal to generate a second time division multiplex signal, and outputting the second time division multiplex signal to a third switch and a fourth switch corresponding to the second nozzle.

Outputting, to the first switch and the third switch, a first selection signal configured to select any one of the first switch and the third switch and a first synchronization signal configured to indicate an opening-closing timing of a selected one of the first switch and the third switch.

Outputting, to the second switch and the fourth switch, a second selection signal configured to select any one of the second switch and the fourth switch and a second synchronization signal configured to indicate an opening-closing timing of a selected one of the second switch and the fourth switch.

Based on the first selection signal and the first synchronization signal, opening and closing the first switch to separate the first driving waveform signal representing the first driving waveform or the second driving waveform signal representing the second driving waveform from the first time division multiplex signal outputted from the first digital-analog converter or opening and closing the third switch to separate the third driving waveform signal representing the third driving waveform or the fourth driving waveform signal representing the fourth driving waveform from the second time division multiplex signal outputted from the second digital-analog converter.

Based on the second selection signal and the second synchronization signal, opening and closing the second switch to separate the first driving waveform signal or the second driving waveform signal from the first time division multiplex signal outputted from the first digital-analog converter or opening and closing the fourth switch to separate the third driving waveform signal or the fourth driving waveform signal from the second time division multiplex signal outputted from the second digital-analog converter.

A head controller for a head including a nozzle configured to discharge a liquid by an energy generating element, a first separator and a second separator, according to another aspect of the present disclosure includes a first signal generator and a second signal generator.

The first signal generator is configured to generate, based on at least first data representing a first driving waveform and second data representing a second driving waveform different from the first driving waveform, a first time division multiplex signal in which a third portion being a part of the second driving waveform is aligned between a first portion being a part of the first driving waveform and a second portion being other part of the first driving waveform, and the second portion is aligned between the third portion and a fourth portion being other part of the second driving waveform, the first time division multiplex signal being capable of transmitting the first data and the second data via a first signal line being single signal line.

The second signal generator is configured to generate, based on at least third data representing a third driving waveform and fourth data representing a fourth driving waveform different from the third driving waveform, a second time division multiplex signal in which a seventh portion being a part of the fourth driving waveform is aligned between a fifth portion being a part of the third driving waveform and a sixth portion being other part of the third driving waveform, and the sixth portion is aligned between the seventh portion and an eighth portion being other part of the fourth driving waveform, the second time division multiplex signal being capable of transmitting the third data and the fourth data via a second signal line being single signal line.

The first separator is configured to separate a first driving waveform signal representing the first driving waveform or a second driving waveform signal representing the second driving waveform from the first time division multiplex signal generated by the first signal generator.

The second separator is configured to separate a third driving waveform signal representing the third driving waveform or a fourth driving waveform signal representing the fourth driving waveform from the second time division multiplex signal generated by the second signal generator.

The energy generating element is driven by the first driving waveform signal or the second driving waveform signal separated by the first separator, or the energy generating element is driven by the third driving waveform signal or the fourth driving waveform signal separated by the second separator.

A waveform of the first time division multiplex signal and a waveform of the second time division multiplex signal are different from each other.

DETAILED DESCRIPTION

In the case of the printer as described above, the four driving pulses are continuously generated during one cycle, but only one driving pulse is selected. On this account, the time, which is allotted to the three driving pulses that are not selected, is the waiting time of the nozzle.

The present disclosure has been made taking the foregoing circumstances into consideration, an object of which is to provide a droplet discharging apparatus, a head control method, and a head controller which make it possible to reduce the waiting time of a nozzle by adjusting the amplitude of a driving waveform applied to an energy generating (applying) element.

In the droplet discharging apparatus, the head control method and a head controller according to the aspects of the present disclosure, the first time division multiplex signal is generated on the basis of the first data which represents the first driving waveform and the second data which represents the second driving waveform different from the first driving waveform, and the second time division multiplex signal is generated on the basis of the third data which represents the third driving waveform and the fourth data which represents the fourth driving waveform different from the third driving waveform. The first driving waveform signal which represents the first driving waveform or the second driving waveform signal which represents the second driving waveform is separated from the generated first time division multiplex signal. The third driving waveform signal which represents the third driving waveform or the fourth driving waveform signal which represents the fourth driving waveform is separated from the generated second time division multiplex signal. The energy generating element is driven by any one of the first driving waveform signal to the fourth driving waveform signal. It is possible to adjust the amplitude of the driving waveform applied to the energy generating element by selecting any one of the first driving waveform signal to the fourth driving waveform signal. Further, only the cycle of any one selected driving waveform is included in one cycle for printing one pixel, and any cycle of any unselected driving waveform is not included in one cycle for printing one pixel. Therefore, it is possible to reduce the waiting time of the nozzle.

First Embodiment

Figure 1:
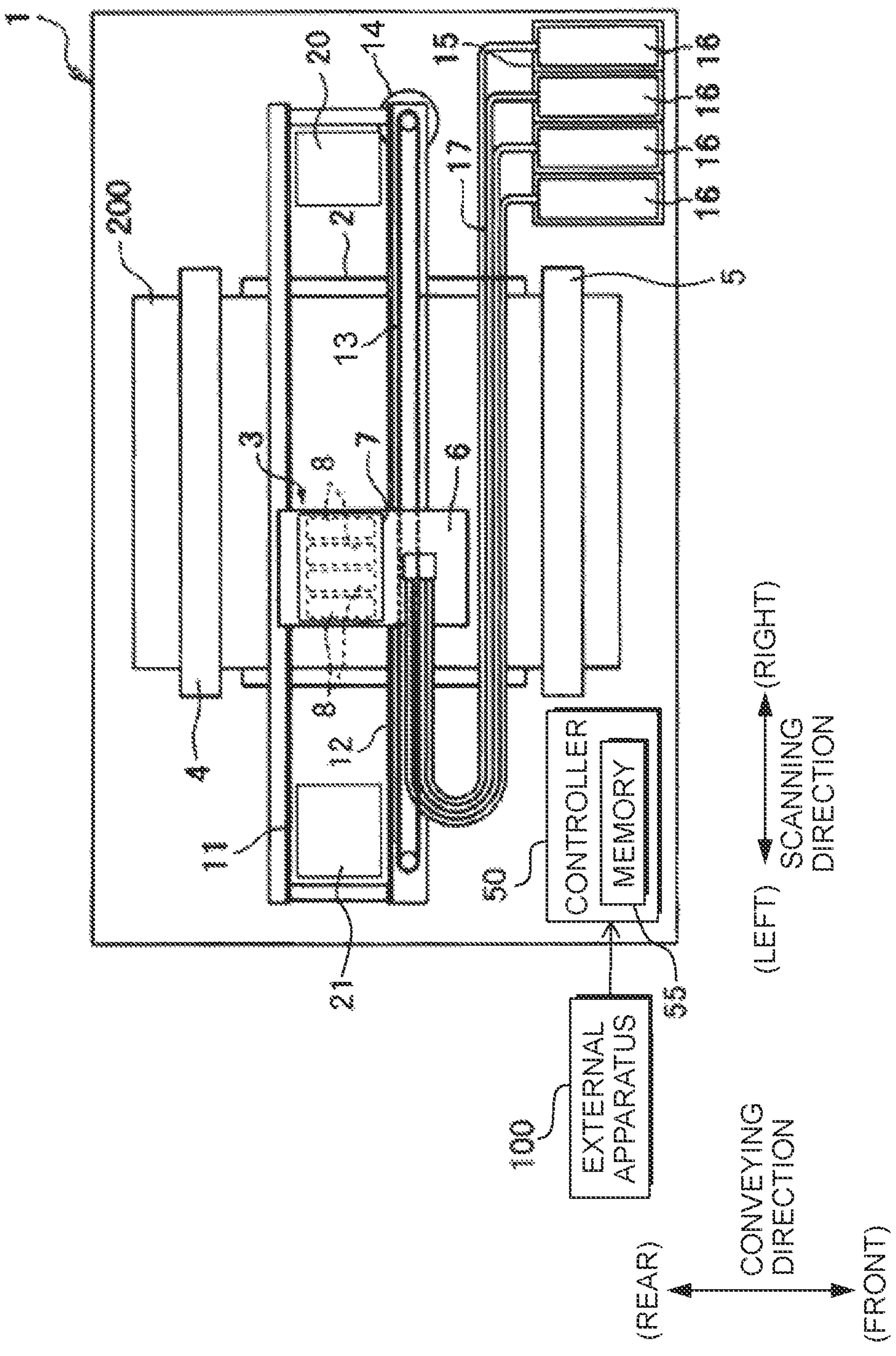
FIG. 1 is a plan view schematically illustrative of a printing apparatus.

The present disclosure will be explained below on the basis of the drawings to show a printing apparatus according to a first embodiment. FIG. 1 is a plan view schematically illustrative of the printing apparatus. In the following explanation, the front, rear, left, and right depicted in FIG. 1 are used. The front-rear direction corresponds to the conveying direction, and the left-right direction corresponds to the scanning direction. In the following explanation, the upward-downward direction is also used. The surface side of FIG. 1 corresponds to the upper side, and the underside corresponds to the lower side. The printing apparatus corresponds to the droplet (liquid droplet) discharging apparatus.

As depicted in FIG. 1, the printing apparatus 1 is provided with, for example, a platen 2, an ink discharging (ejecting, jetting) device 3, and conveying rollers 4, 5. Recording paper 200, which is a recording medium, is placed on the upper surface of the platen 2. The ink discharging device 3 records an image by discharging inks to the recording paper 200 placed on the platen 2. The ink discharging device 3 is provided with, for example, a carriage 6, a subtank 7, four ink-jet heads 8, and a circulating pump (not depicted).

Two guide rails 11, 12, which guide the carriage 6 and which extend in the left-right direction, are provided over or above the platen 2. An endless belt 13, which extends in the left-right direction, is connected to the carriage 6. The endless belt 13 is driven by a carriage driving motor 14. The carriage 6 is reciprocatively moved in the scanning direction in an area opposed to the platen 2 while being guided by the guide rails 11, 12 in accordance with the driving of the endless belt 13. More specifically, the carriage 6 performs the first movement in which the head is moved from a certain position to another position from the left to the right in the scanning direction, and the second movement in which the head is moved from the other position to the certain position from the right to the left in the scanning direction, in a state in which the carriage 6 supports the four ink-jet heads 8.

A cap 20 and a flashing receiver 21 are provided between the guide rails 11, 12. The cap 20 and the flashing receiver 21 are arranged under or below the ink discharging device 3. The cap 20 is arranged at right end portions of the guide rails 11, 12, and the flashing receiver 21 is arranged at left end portions of the guide rails 11, 12. Note that the cap 20 may be arranged at left end portions of the guide rails 11, 12, and the flashing receiver 21 may be arranged at right end portions of the guide rails 11, 12.

The subtank 7 and the four ink-jet heads 8 are carried on the carriage 6, and they are reciprocatively moved in the scanning direction together with the carriage 6. The subtank 7 is connected to a cartridge holder 15 via tubes 17. An ink cartridge or ink cartridges 16 of one color or a plurality of colors (four colors in this embodiment) is/are installed to the cartridge holder 15. The four colors are exemplified, for example, by black, yellow, cyan, and magenta.

Four ink chambers (not depicted) are formed at the inside of the subtank 7. The four color inks, which are supplied from the four ink cartridges 16, are stored in the four ink chambers respectively.

The four ink-jet heads 8 are aligned in the scanning direction on the lower side of the subtank 7. A plurality of nozzles 80 (see FIG. 2) are formed on the lower surface of each of the ink-jet heads 8. One ink-jet head 8 corresponds to one color ink, which is connected to one ink chamber of the subtank 7. That is, the four ink-jet heads 8 correspond to the four color inks respectively, which are connected to the four ink chambers of the subtank 7 respectively.

The ink-jet head 8 is provided with an ink supply port and an ink discharge port. The ink supply port and the ink discharge port are connected to the ink chamber of the subtank 7, for example, via tubes. A circulating pump intervenes between the ink supply port and the ink chamber.

The ink, which is fed from the ink chamber by the circulating pump, passes through the ink supply port to flow into the ink-jet head 8, and the ink is discharged from the nozzle 80. The ink, which has not been discharged (ejected) from the nozzle 80, passes through the ink discharge port, and the ink returns to the ink chamber. The ink is circulated between the ink chamber and the ink-jet head 8. The four ink-jet heads 8 discharges (ejects) the four color inks supplied from the subtank 7 onto the recording paper 200, while being moved in the scanning direction together with the carriage 6.

As depicted in FIG. 1, the conveying roller 4 is arranged on the upstream side (rear side) in the conveying direction as compared with the platen 2. The conveying roller 5 is arranged on the downstream side (front side) in the conveying direction as compared with the platen 2. The two conveying rollers 4, 5 are synchronously driven by a motor (not depicted). The two conveying rollers 4, 5 convey the recording paper 200 placed on the platen 2 in the conveying direction orthogonal to the scanning direction. The printing apparatus 1 is provided with a controller 50. The controller 50 is provided with, for example, CPU or a logic circuit (for example, FPGA), and a memory 55 such as a nonvolatile memory and RAM or the like. The controller 50 receives the printing job and the driving waveform data from an external apparatus 100, and the controller 50 stores the printing job and the driving waveform data in the memory 55. The controller 50 controls the driving of, for example, the ink discharging device 3 and the conveying roller 4 on the basis of the printing job to execute the printing process.

Figure 2:
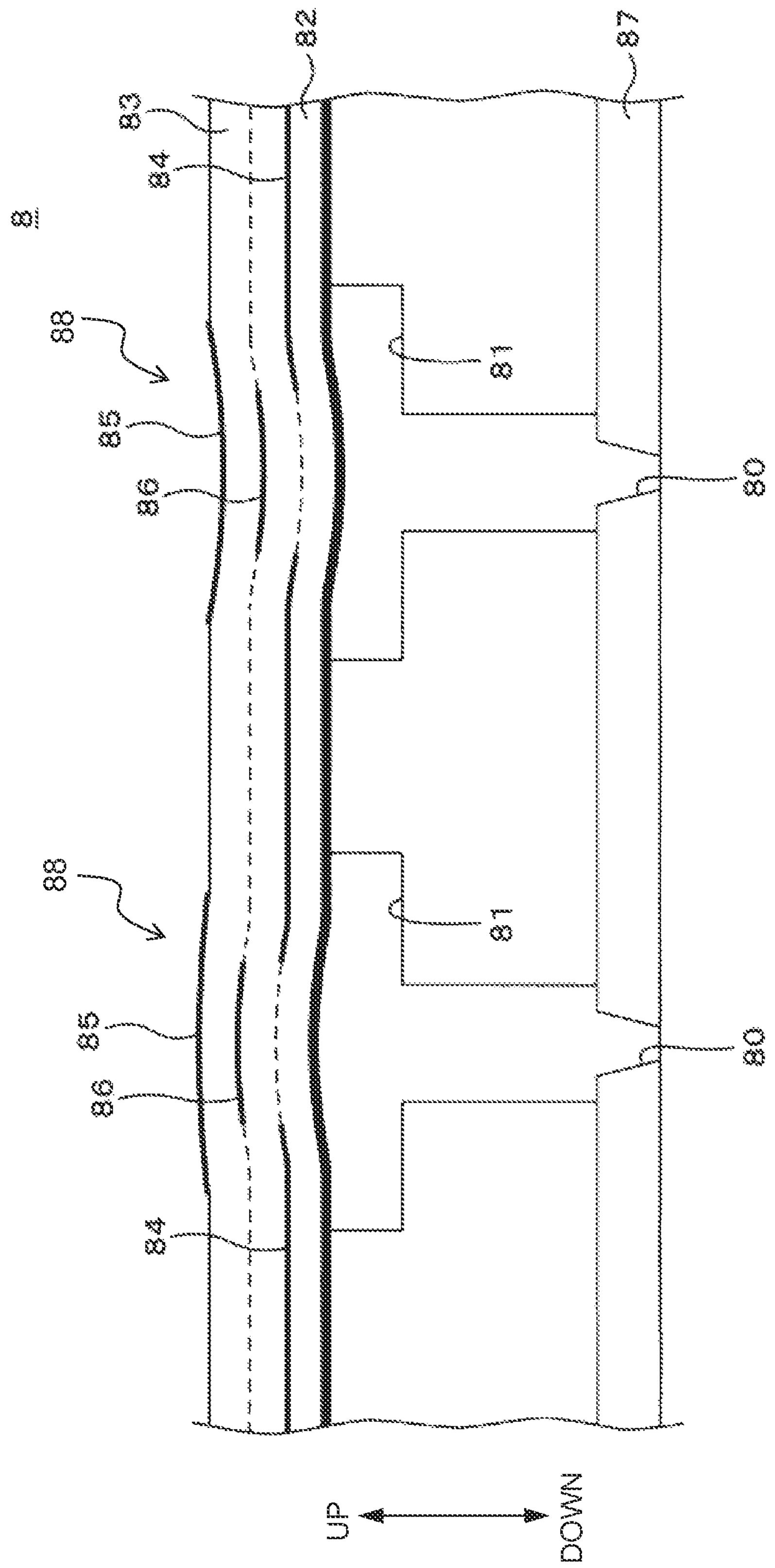
FIG. 2 is a partial enlarged sectional view schematically illustrative of an ink-jet head.

FIG. 2 is a partial enlarged sectional view schematically illustrative of the ink-jet head 8. The ink-jet head 8 is provided with a plurality of pressure chambers 81. The plurality of pressure chambers 81 constitute a plurality of pressure chamber arrays. A vibration plate 82 is formed on the upper side of the pressure chamber 81. A layered piezoelectric member 83 is formed on the upper side of the vibration plate 82. A first common electrode 84 is formed between the piezoelectric member 83 and the vibration plate 82 on the upper side of each of the pressure chambers 81.

A second common electrode 86 is provided at the inside of the piezoelectric member 83. The second common electrode 86 is arranged on the upper side of each of the pressure chambers 81 and on the upper side of the first common electrode 84. The second common electrode 86 is arranged at the position at which the second common electrode 86 is not opposed to the first common electrode 84. An individual electrode 85 is formed on the upper surface of the piezoelectric member 83 on the upper side of each of the pressure chambers 81. The individual electrode 85 is vertically opposed to the first common electrode 84 and the second common electrode 86 with the piezoelectric member 83 intervening therebetween. The vibration plate 82, the piezoelectric member 83, the first common electrode 84, the individual electrode 85, and the second common electrode 86 constitute an actuator 88. The actuator 88 includes a first actuator 88(1), a second actuator 88(2), . . . , and an Nth actuator 88(N) (see FIG. 3).

A nozzle plate 87 is provided under or below the respective pressure chambers 81. A plurality of nozzles 80, which vertically penetrate, are formed through the nozzle plate 87. Each of the nozzles 80 is arranged on the lower side of each of the pressure chambers 81. The plurality of nozzles 80 constitute a plurality of nozzle arrays which extend along the pressure chamber arrays.

The first common electrode 84 is connected to the COM terminal, i.e. the ground in this embodiment. The second common electrode 86 is connected to the VCOM terminal. The VCOM voltage is higher than the COM voltage. The individual electrode 85 is connected to a switch group 54 (see FIG. 3). The High or Low voltage is applied to the individual electrode 85, and thus the piezoelectric member 83 is deformed, and the vibration plate 82 is vibrated. The ink is discharged from the pressure chamber 81 via the nozzle 80 in accordance with the vibration of the vibration plate 82.

Figure 3:
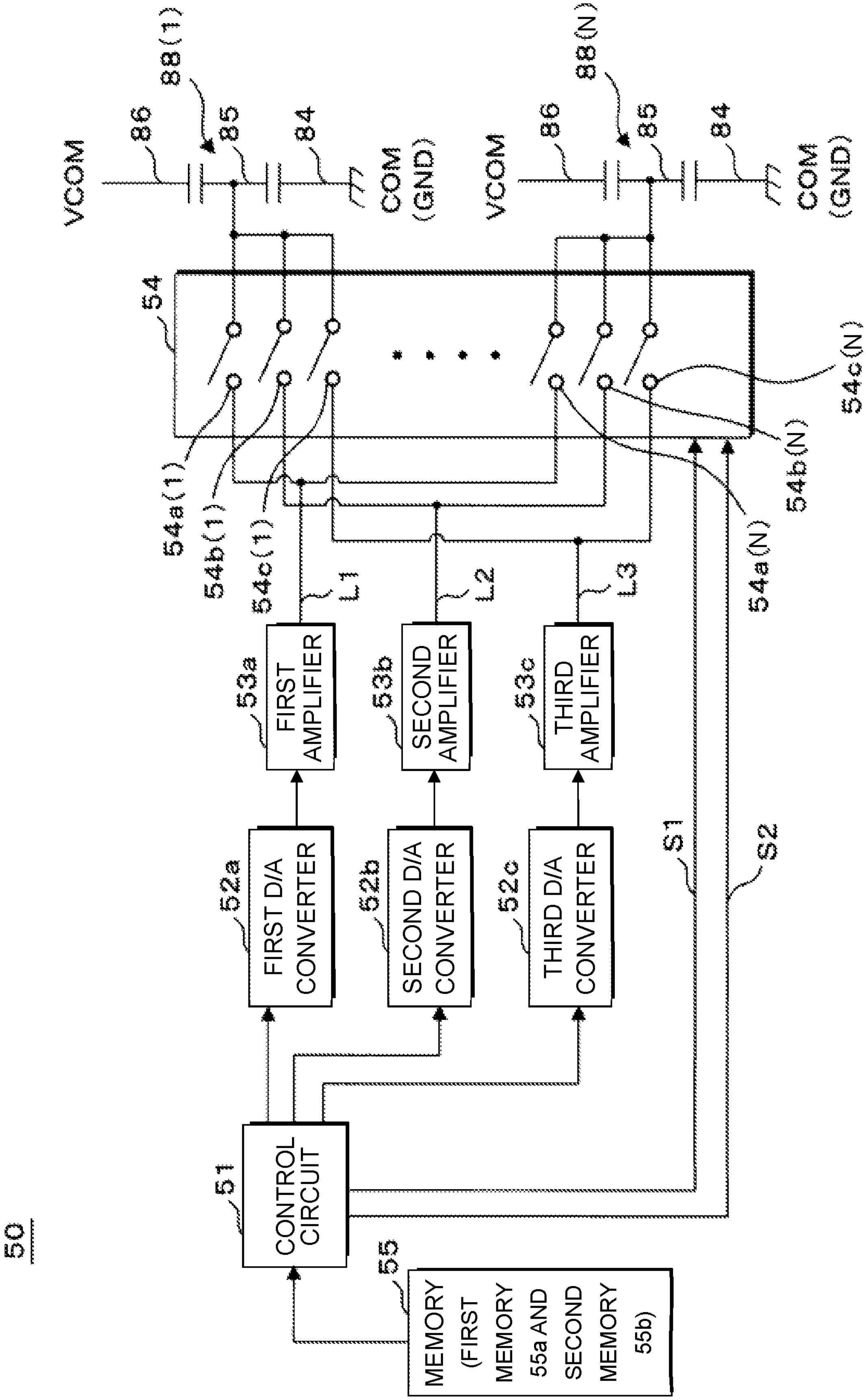
FIG. 3 is a block diagram of a controller.
Figure 4:
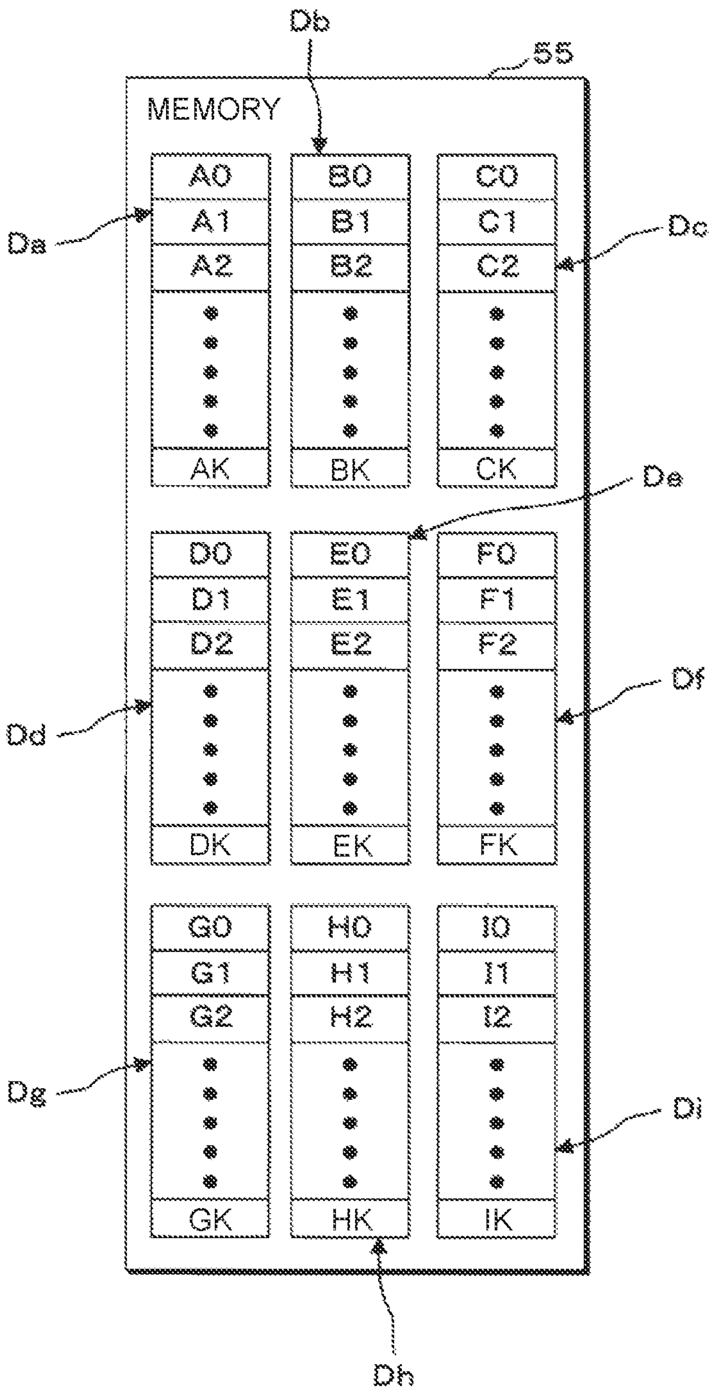
FIG. 4 is a block diagram illustrative of driving waveform data stored in a memory.

FIG. 3 is a block diagram of the controller 50. FIG. 4 is a block diagram illustrative of driving waveform data stored in the memory 55. The controller 50 is provided with a control circuit 51, a first D/A converter 52*a*, a second D/A converter 52*b*, a third D/A converter 52*c*, a first amplifier 53*a*, a second amplifier 53*b*, a third amplifier 53*c*, the switch group 54, and a memory 55 (a first memory 55*a* and a second memory 55*b*). The driving waveform data is stored in the memory 55. The driving waveform data is the data which represents the voltage waveform applied to the individual electrode 85, i.e., the driving waveform for driving the actuator 88. The driving waveform data is the quantized data. In this embodiment, the driving waveform data Da, Db, Dc, Dd, De, Df, Dg, Dh and Di are stored in the memory 55 (see FIG. 4).

The first D/A converter 52*a*, the second D/A converter 52*b* and the third D/A converter 52*c* convert the digital signal into the analog signal. The first amplifier 53*a*, the second amplifier 53*b* and the third amplifier 53*c* amplify the analog signal. The first amplifier 53*a* is connected to the switch group 54 via a first signal line L1 being single signal line, the second amplifier 53*b* is connected to the switch group 54 via a second signal line L2 being single signal line, and the third amplifier 53*c* is connected to the switch group 54 via a third signal line L3 being single signal line.

The switch group 54 is provided with a plurality of a-switches 54*a*(n) (n=1, 2, . . . , N). The plurality of a-switches 54*a*(n) include a first a-switch 54*a*(1), a second a-switch 54*a*(2), . . . , and an Nth a-switch 54*a*(N). The switch group 54 is provided with a plurality of b-switches 54*b*(n) (n=1, 2, . . . , N). The plurality of b-switches 54*b*(n) include a first b-switch 54*b*(1), a second b-switch 54*b*(2), . . . , and an Nth b-switch 54*b*(N). The switch group 54 is provided with a plurality of c-switches 54*c*(n) (n=1, 2, . . . , N). The plurality of c-switches 54*c*(n) include a first c-switch 54*c*(1), a second c-switch 54*c*(2), . . . , and an Nth c-switch 54*c*(N). Each of the a-switches 54*a*(n), the b-switches 54*b*(n), and the c-switches 54*c*(n) is configured, for example, by an analog switch IC.

One end of each of the first a-switch 54*a*(1), the second a-switch 54*a*(2), . . . , and the Nth a-switch 54*a*(N) is connected to the first amplifier 53*a* via the first signal line L1. The other end of each of the first a-switch 54*a*(1), the second a-switch 54*a*(2), . . . , and the Nth a-switch 54*a*(N) is connected to the individual electrode 85 of one of the first actuator 88(1), the second actuator 88(2), . . . , and the Nth actuator 88(N).

One end of each of the first b-switch 54*b*(1), the second b-switch 54*b*(2), . . . , and the Nth b-switch 54*b*(N) is connected to the second amplifier 53*b* via the second signal line L2. The other end of each of the first b-switch 54*b*(1), the second b-switch 54*b*(2), . . . , and the Nth b-switch 54*b*(N) is connected to the individual electrode 85 of one of the first actuator 88(1), the second actuator 88(2), . . . , and the Nth actuator 88(N).

One end of each of the first c-switch 54*c*(1), the second c-switch 54*c*(2), . . . , and the Nth c-switch 54*c*(N) is connected to the third amplifier 53*c* via the third signal line L3. The other end of each of the first c-switch 54*c*(1), the second c-switch 54*c*(2), . . . , and the Nth c-switch 54*c*(N) is connected to the individual electrode 85 of one of the first actuator 88(1), the second actuator 88(2), . . . , and the Nth actuator 88(N).

Figure 5:
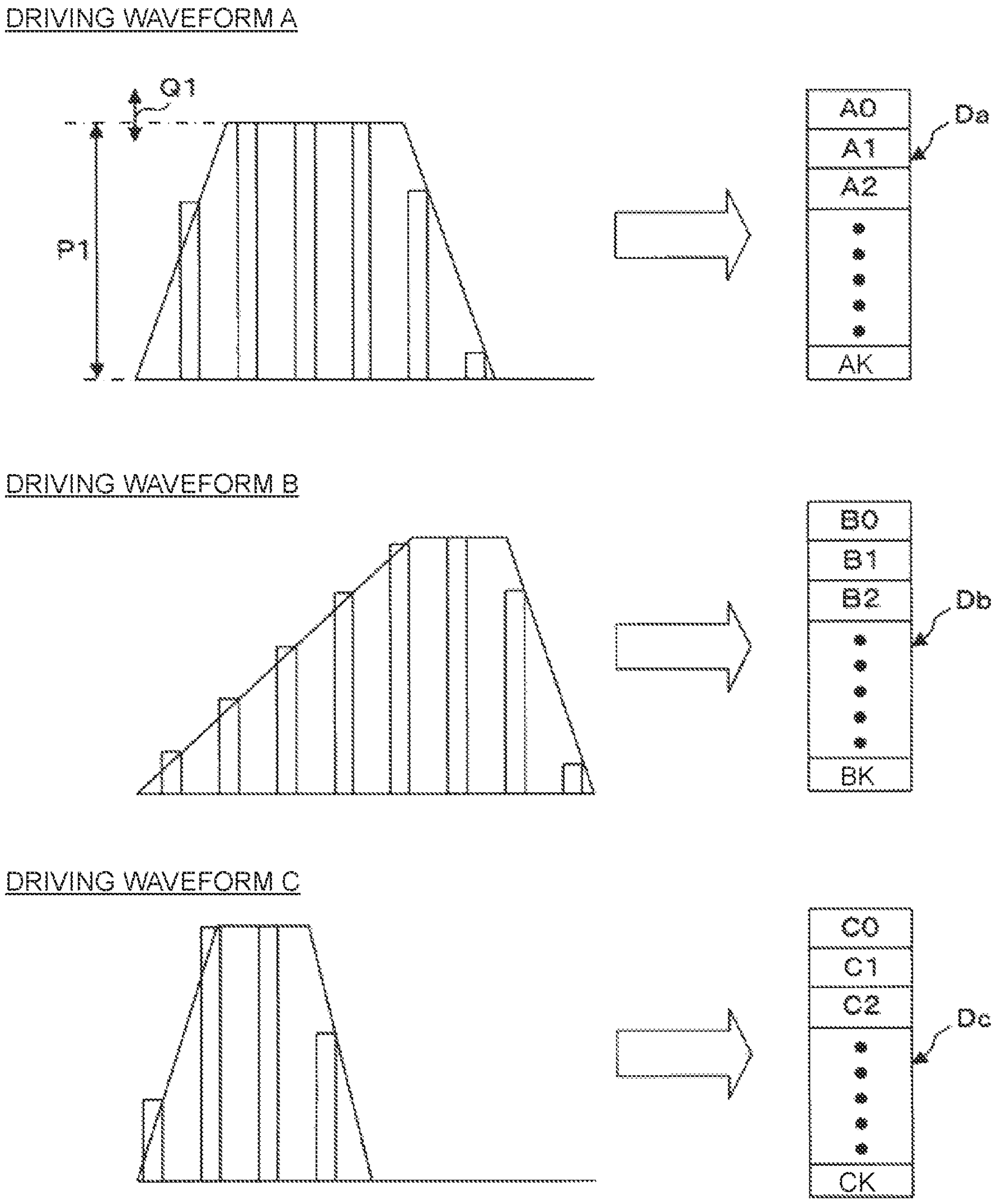
FIG. 5 is an explanatory drawing to explain examples of the relationships between the driving waveforms A, B, C and the driving waveform data Da, Db, Dc.

FIG. 5 is an explanatory drawing to explain examples of the relationships between the driving waveforms A, B, C and the driving waveform data Da, Db, Dc. In the driving waveforms depicted in FIG. 5, the right side depicts the past state as compared with the left side. The driving waveforms depicted in FIG. 6, FIG. 7, and FIG. 14 to FIG. 16 as well as FIG. 8 to FIG. 12 and FIG. 17 to FIG. 19 are depicted in the same manner as described above. The respective shapes of the driving waveforms A, B, C are different from each other, and they do not approximate (are not similar) to one another. However, the maximum amplitudes of the respective driving waveforms A, B, C are substantially identical with each other, and they are within, for example, a first range Q1 on the basis of a first amplitude value P1. The first range Q1 refers to, for example, a range of "first amplitude value P1±α". The magnitude of α is sufficiently smaller than the magnitude of the first amplitude value P1. Note that the respective maximum amplitudes of the driving waveforms A, B, C may be identical with each other.

The data, which is obtained by converting the driving waveform A into a digital signal by using a predetermined sampling frequency, is the driving waveform data Da. The data, which is obtained by converting the driving waveform B into a digital signal by using a predetermined sampling frequency, is the driving waveform data Db. The data, which is obtained by converting the driving waveform C into a digital signal by using a predetermined sampling frequency, is the driving waveform data Dc.

The driving waveform data Da is the quantized data of the driving waveform A, the driving waveform data Db is the quantized data of the driving waveform B, and the driving waveform data Dc is the quantized data of the driving waveform C. The driving waveform data Da has the quantized data Ak (k=0, 1, 2, . . . , K), the driving waveform data Db has the quantized data Bk (k=0, 1, 2, . . . , K), and the driving waveform data Dc has the quantized data Ck (k=0, 1, 2, . . . , K).

Figure 6:
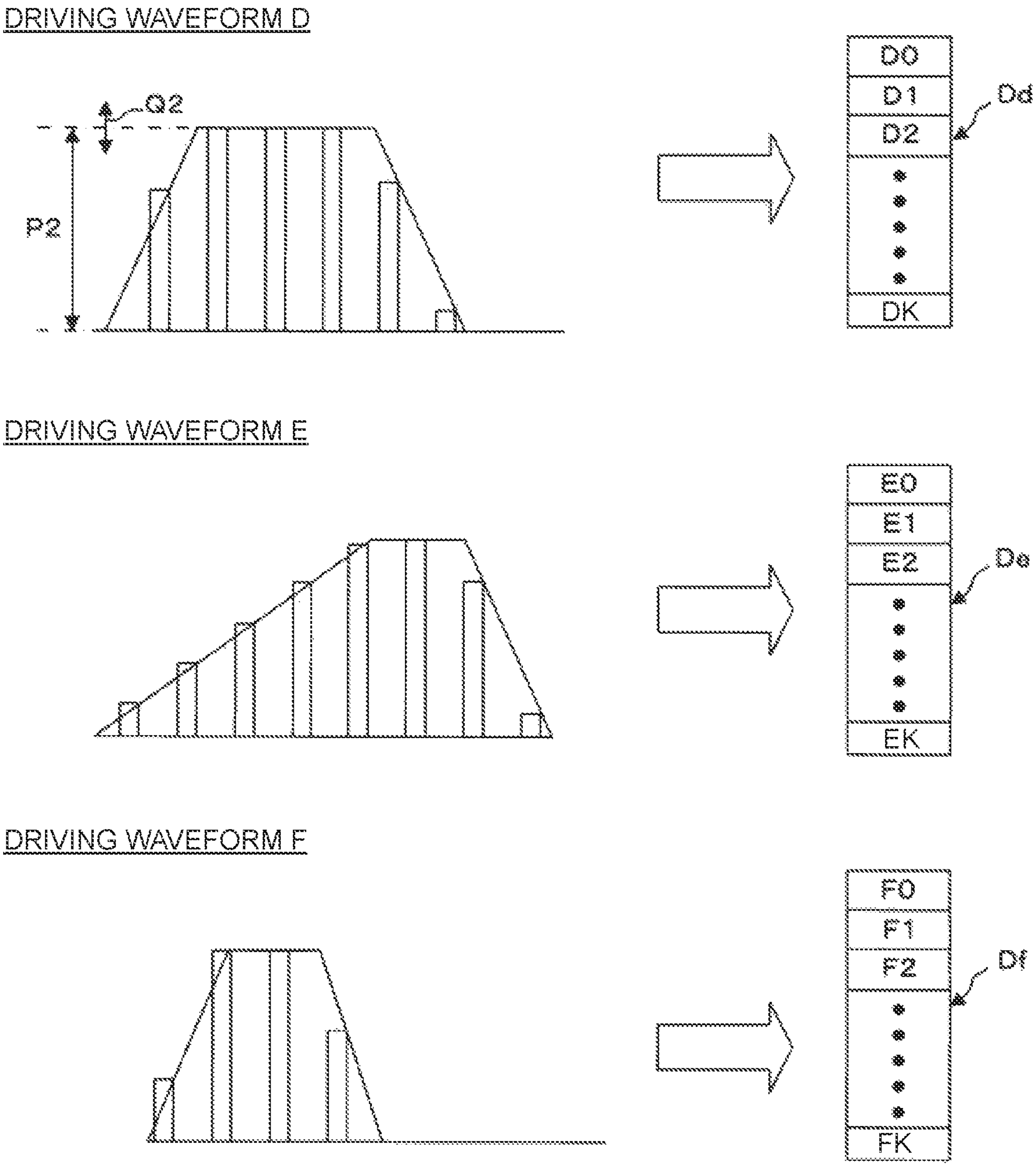
FIG. 6 is an explanatory drawing to explain examples of the relationships between the driving waveforms D, E, F and the driving waveform data Dd, De, Df.

FIG. 6 is an explanatory drawing to explain examples of the relationships between the driving waveforms D, E, F and the driving waveform data Dd, De, Df. The respective shapes of the driving waveforms D, E, F are different from each other, and they do not approximate (are not similar) to one another. However, the maximum amplitudes of the respective driving waveforms D, E, F are substantially identical with each other, and they are within, for example, a second range Q2 on the basis of a second amplitude value P2. The second amplitude value P2 is smaller than the first amplitude value P1. The second range Q2 refers to, for example, a range of "second amplitude value P2±β". The magnitude of β is sufficiently smaller than the magnitude of the second amplitude value P2. Note that the respective maximum amplitudes of the driving waveforms D, E, F may be identical with each other.

The data, which is obtained by converting the driving waveform D into a digital signal by using a predetermined sampling frequency, is the driving waveform data Dd. The data, which is obtained by converting the driving waveform E into a digital signal by using a predetermined sampling frequency, is the driving waveform data De. The data, which is obtained by converting the driving waveform F into a digital signal by using a predetermined sampling frequency, is the driving waveform data Df.

The driving waveform data Dd is the quantized data of the driving waveform D, the driving waveform data De is the quantized data of the driving waveform E, and the driving waveform data Df is the quantized data of the driving waveform F. The driving waveform data Dd has the quantized data Dk (k=0, 1, 2, . . . , K), the driving waveform data De has the quantized data Ek (k=0, 1, 2, . . . , K), and the driving waveform data Df has the quantized data Fk (k=0, 1, 2, . . . , K).

Figure 7:
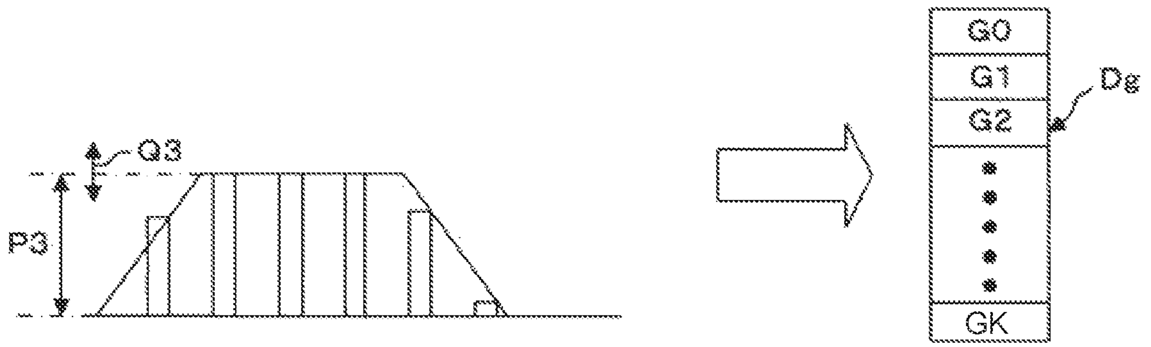
FIG. 7 is an explanatory drawing to explain examples of the relationships between the driving waveforms G, H, I and the driving waveform data Dg, Dh, Di.
Figure 7:
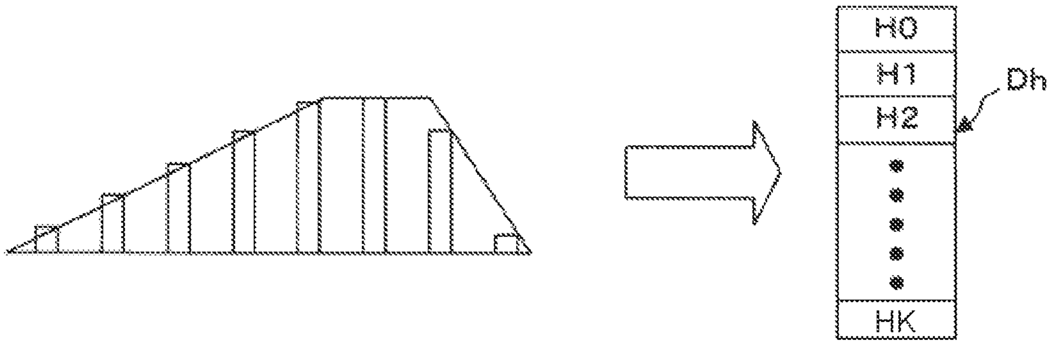
Figure 7:
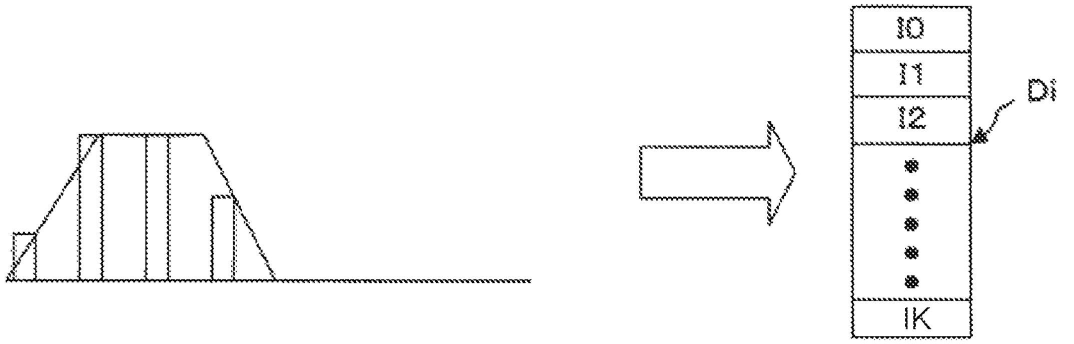

FIG. 7 is an explanatory drawing to explain examples of the relationships between the driving waveforms G, H, I and the driving waveform data Dg, Dh, Di. The respective shapes of the driving waveforms G, H, I are different from each other, and they do not approximate (are not similar) to one another. However, the maximum amplitudes of the respective driving waveforms G, H, I are substantially identical with each other, and they are within, for example, a third range Q3 on the basis of a third amplitude value P3. The third amplitude value P3 is smaller than the second amplitude value P2. The third range Q3 refers to, for example, a range of "third amplitude value P3±γ". The magnitude of γ is sufficiently smaller than the magnitude of the third amplitude value P3. Note that the respective maximum amplitudes of the driving waveforms G, H, I may be identical with each other.

The data, which is obtained by converting the driving waveform G into a digital signal by using a predetermined sampling frequency, is the driving waveform data Dg. The data, which is obtained by converting the driving waveform H into a digital signal by using a predetermined sampling frequency, is the driving waveform data Dh. The data, which is obtained by converting the driving waveform I into a digital signal by using a predetermined sampling frequency, is the driving waveform data Di.

The driving waveform data Dg is the quantized data of the driving waveform G, the driving waveform data Dh is the quantized data of the driving waveform H, and the driving waveform data Di is the quantized data of the driving waveform I. The driving waveform data Dg has the quantized data Gk (k=0, 1, 2, . . . , K), the driving waveform data Dh has the quantized data Hk (k=0, 1, 2, . . . , K), and the driving waveform data Di has the quantized data Ik (k=0, 1, 2, . . . , K).

Figure 8:
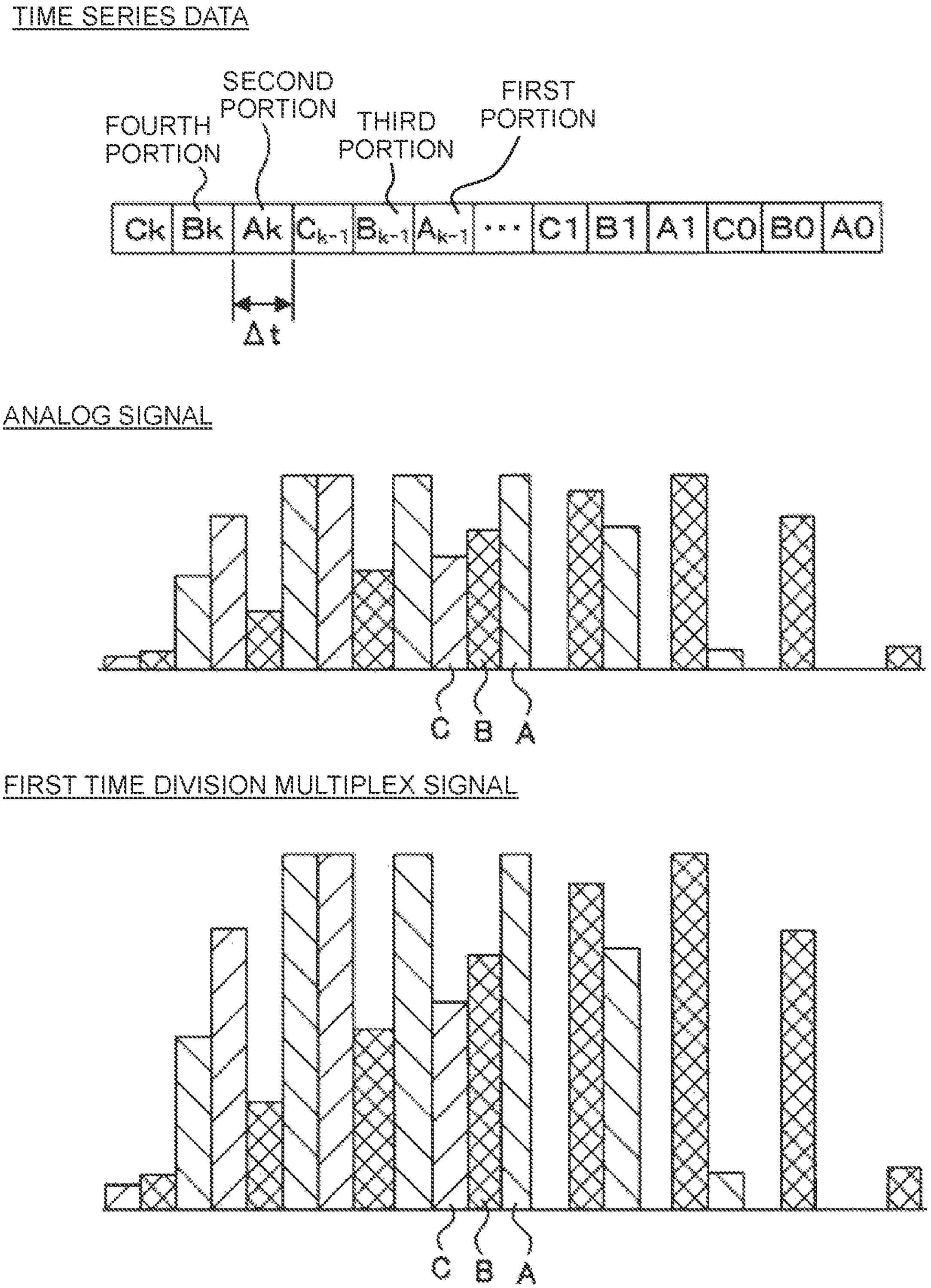
FIG. 8 is an explanatory drawing to explain examples of the time series data, the analog signal, and the first time division multiplex signal.

FIG. 8 is an explanatory drawing to explain examples of the time series data, the analog signal, and the first time division multiplex signal. In FIG. 8, the characters of A, B, C indicate the correspondence to the driving waveforms A, B, C respectively. The control circuit 51 accesses the memory 55 to acquire the driving waveform data Da, Db, Dc of the driving waveforms A, B, C having approximately the same maximum amplitude so that the time series data is prepared. In the time series data, the data Ak, Bk, Ck are successively aligned while providing time intervals Δt. The data Ak, Bk, Ck are aligned in an order of A0, B0, C0, A1, B1, C1, . . . , AK, BK, CK. The time series data is the digital signal. Each of the time interval from Ak−1 to Ak, the time interval from Bk−1 to Bk, and the time interval from Ck−1 to Ck is 3Δt.

The control circuit 51 outputs the time series data to the first D/A converter 52*a*. As depicted in FIG. 8, the first D/A converter 52*a* converts the time series data into the analog signal which is outputted to the first amplifier 53*a*. The first amplifier 53*a* amplifies the inputted analog signal, and the amplified signal is outputted to the switch group 54. As depicted in FIG. 8, the analog signal, which has been amplified by the first amplifier 53*a*, configures the first time division multiplex signal. In the first time division multiplex signal, it is assumed that the portion corresponding to the data Ak−1 is designated as "first portion", the portion corresponding to the data Ak is designated as "second portion", the portion corresponding to the data Bk−1 is designated as "third portion", and the portion corresponding to the data Bk is designated as "fourth portion". On this assumption, the third portion is present between the first portion and the second portion, and the second portion is present between the third portion and the fourth portion. Note that the same or equivalent relationship also holds between the data Ak and the data Ck, and the same or equivalent relationship also holds between the data Bk and the data Ck. For example, the control circuit 51, the first D/A converter 52*a*, the first amplifier 53*a*, and first memory 55*a* configure the first signal generator (first multiplexer, first multiplexing unit).

Figure 9:
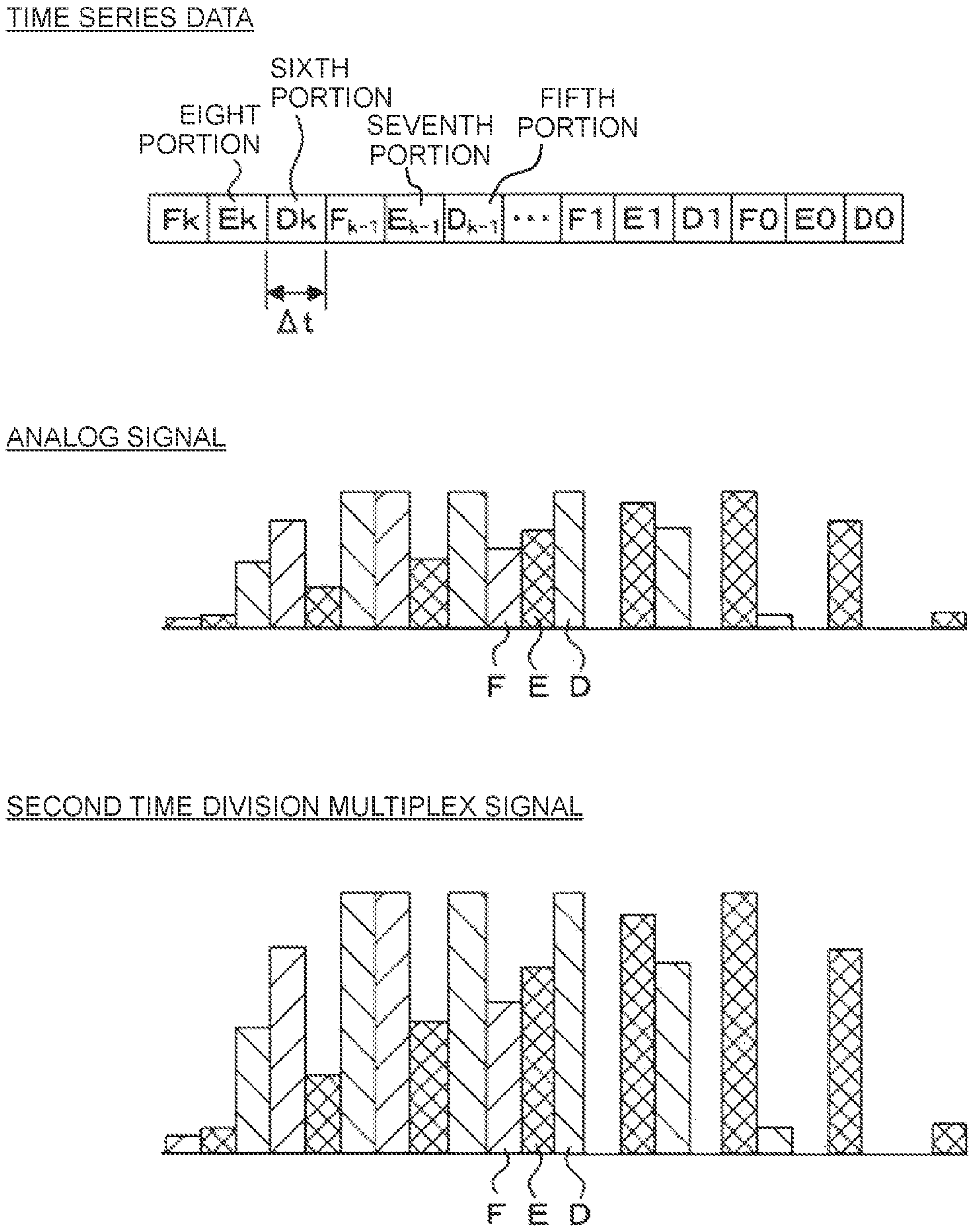
FIG. 9 is an explanatory drawing to explain examples of the time series data, the analog signal, and the second time division multiplex signal.

FIG. 9 is an explanatory drawing to explain examples of the time series data, the analog signal, and the second time division multiplex signal. In FIG. 9, the characters of D, E, F indicate the correspondence to the driving waveforms D, E, F respectively. The control circuit 51 accesses the memory 55 to acquire the driving waveform data Dd, De, Df of the driving waveforms D, E, F having approximately the same maximum amplitude so that the time series data is prepared. In the time series data, the data Dk, Ek, Fk are successively aligned while providing time intervals Δt. The data Dk, Ek, Fk are aligned in an order of D0, E0, F0, D1, E1, F1, . . . , DK, EK, FK. The time series data is the digital signal. Each of the time interval from Dk−1 to Dk, the time interval from Ek−1 to Ek, and the time interval from Fk−1 to Fk is 3Δt.

The control circuit 51 outputs the time series data to the second D/A converter 52*b*. As depicted in FIG. 9, the second D/A converter 52*b* converts the time series data into the analog signal which is outputted to the second amplifier 53*b*. The second amplifier 53*b* amplifies the inputted analog signal, and the amplified signal is outputted to the switch group 54. As depicted in FIG. 9, the analog signal, which has been amplified by the second amplifier 53*b*, configures the second time division multiplex signal. In the second time division multiplex signal, it is assumed that the portion corresponding to the data Dk−1 is designated as "fifth portion", the portion corresponding to the data Dk is designated as "sixth portion", the portion corresponding to the data Ek−1 is designated as "seventh portion", and the portion corresponding to the data Ek is designated as "eighth portion". On this assumption, the seventh portion is present between the fifth portion and the sixth portion, and the sixth portion is present between the seventh portion and the eighth portion. Note that the same or equivalent relationship also holds between the data Ek and the data Fk, and the same or equivalent relationship also holds between the data Fk and the data Dk. For example, the control circuit 51, the second D/A converter 52*b*, the second amplifier 53*b*, and second memory 55*b* configure the second signal generator (second multiplexer, second multiplexing unit).

Figure 10:
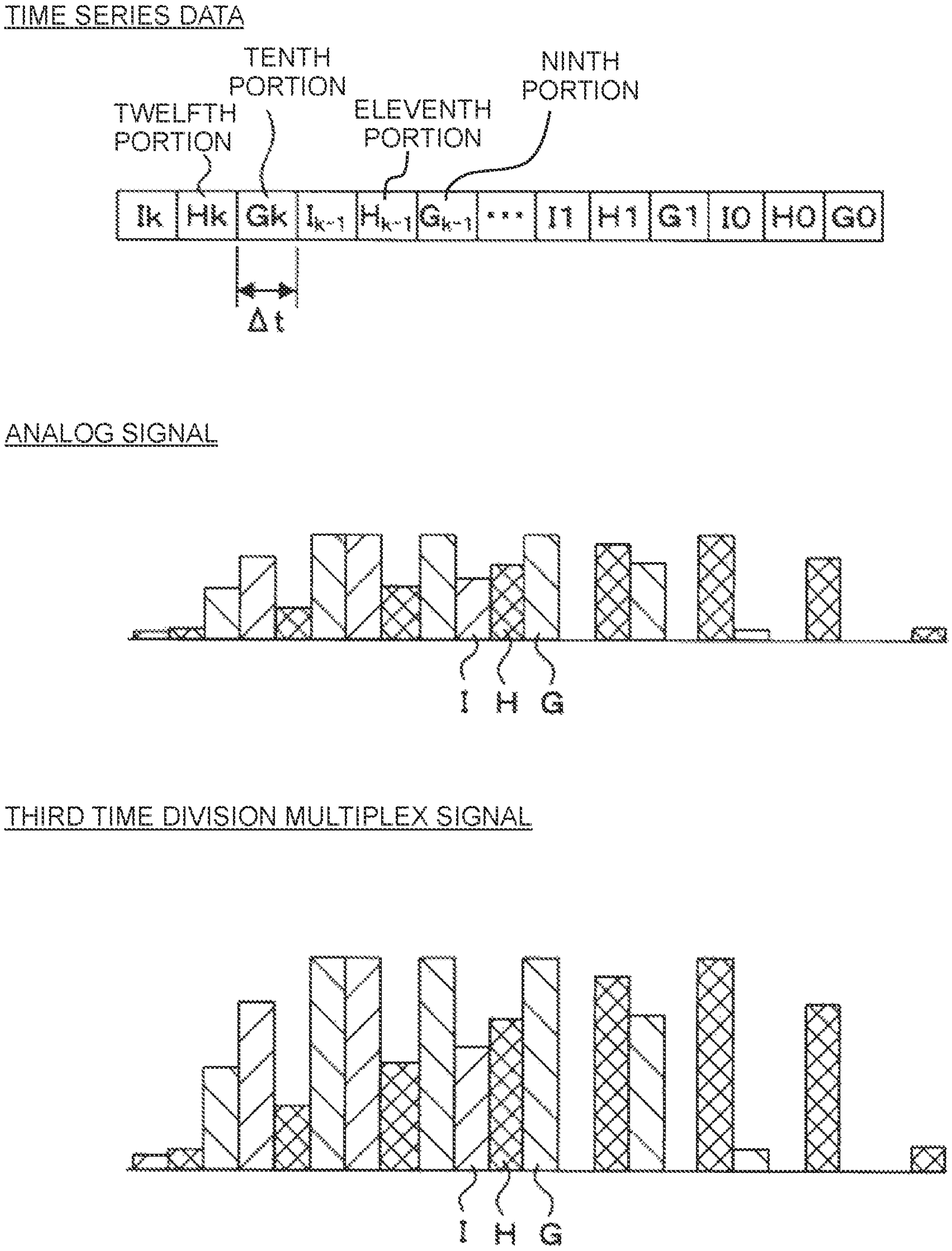
FIG. 10 is an explanatory drawing to explain examples of the time series data, the analog signal, and the third time division multiplex signal.

FIG. 10 is an explanatory drawing to explain examples of the time series data, the analog signal, and the third time division multiplex signal. In FIG. 10, the characters of G, H, I indicate the correspondence to the driving waveforms G, H, I respectively. The control circuit 51 accesses the memory 55 to acquire the driving waveform data Dg, Dh, Di of the driving waveforms G, H, I having approximately the same maximum amplitude so that the time series data is prepared. In the time series data, the data Gk, Hk, Ik are successively aligned while providing time intervals Δt. The data Gk, Hk, Ik are aligned in an order of G0, H0, I0, G1, H1, I1, . . . , GK, HK, IK. The time series data is the digital signal. Each of the time interval from Gk−1 to Gk, the time interval from Hk−1 to Hk, and the time interval from Ik−1 to Ik is 3Δt.

The control circuit 51 outputs the time series data to the third D/A converter 52*c*. As depicted in FIG. 10, the third D/A converter 52*c* converts the time series data into the analog signal which is outputted to the third amplifier 53*c*. The third amplifier 53*c* amplifies the inputted analog signal, and the amplified signal is outputted to the switch group 54. As depicted in FIG. 10, the analog signal, which has been amplified by the third amplifier 53*c*, configures the third time division multiplex signal. In the third time division multiplex signal, it is assumed that the portion corresponding to the data Gk−1 is designated as "ninth portion", the portion corresponding to the data Gk is designated as "tenth portion", the portion corresponding to the data Hk−1 is designated as "eleventh portion", and the portion corresponding to the data Hk is designated as "twelfth portion". On this assumption, the eleventh portion is present between the ninth portion and the tenth portion, and the tenth portion is present between the eleventh portion and the twelfth portion.

The control circuit 51 outputs, to the switch group 54, the switch control signal Si for controlling the opening and closing of the plurality of nth a-switches 54*a*(n), the plurality of nth b-switches 54*b*(n), or the plurality of nth c-switches 54*c*(n), the synchronization signal S2*a* corresponding to the driving waveform A, D, G, the synchronization signal S2*b* corresponding to the driving waveform B, E, H, and the synchronization signal S2*c* corresponding to the driving waveform C, F, I. Note that the three synchronization signals S2*a*, S2*b*, S2*c* are simply expressed as "synchronization signal S2" as well (see FIG. 3). The switch control signal Si includes the first selection information which indicates that any one of the nth a-switch 54*a*(n), the nth b-switch 54*b*(n), and the nth c-switch 54*c*(n) is selected, and the second selection information which indicates that any one of the three synchronization signals S2*a*, S2*b*, S2*c* is selected, in relation to each of the plurality of actuators 88. The first selection information and the second selection information are linked.

The selection of the nth a-switch 54*a*(n) is the selection of the first time division multiplex signal, the selection of the nth b-switch 54*b*(n) is the selection of the second time division multiplex signal, and the selection of the nth c-switch 54*c*(n) is the selection of the third time division multiplex signal.

Figure 11:
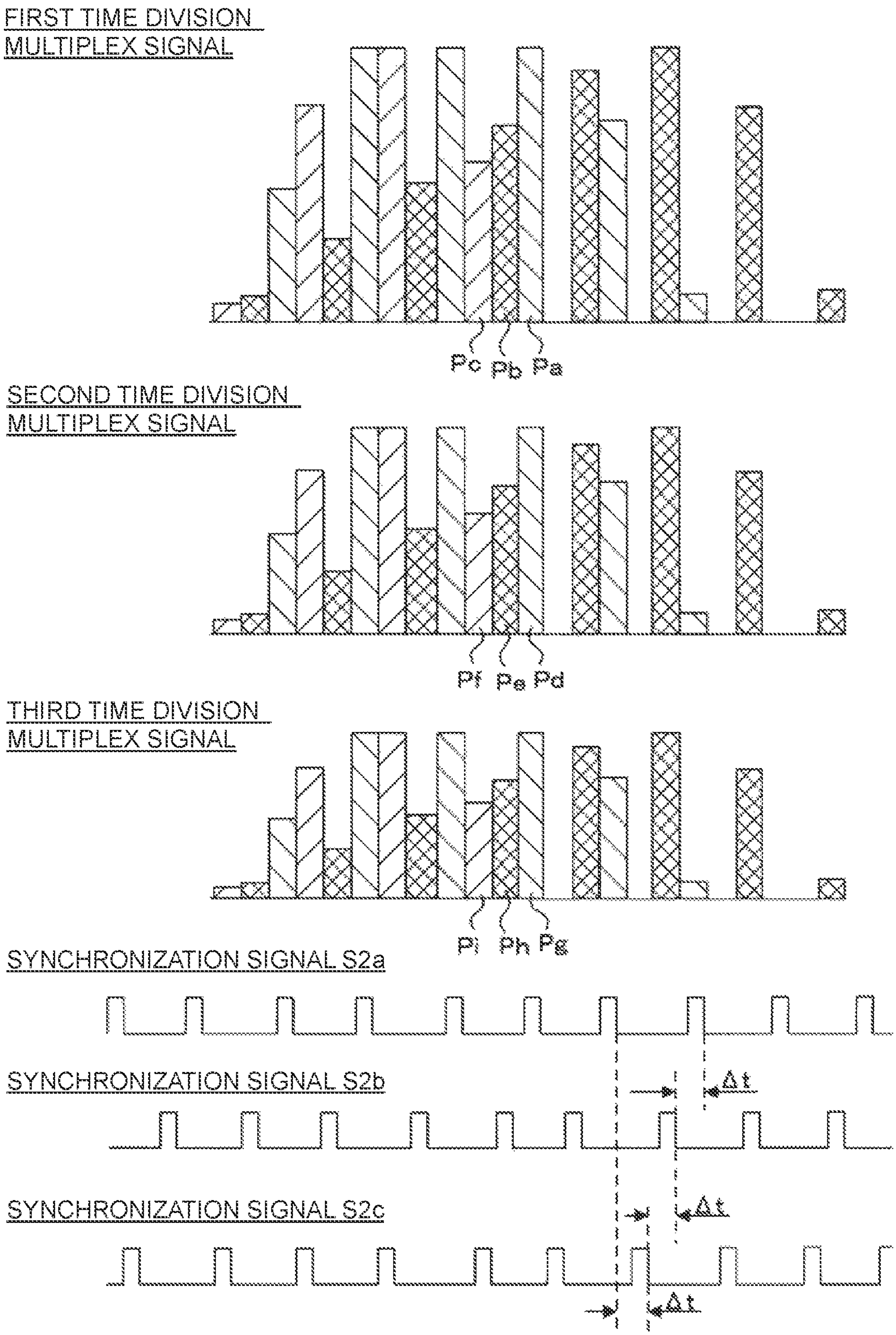
FIG. 11 is an explanatory drawing to explain the relationships between the first to third time division multiplex signals and the synchronization signals.

FIG. 11 is an explanatory drawing to explain the relationships between the first to third time division multiplex signals and the synchronization signals S2*a*, S2*b*, S2*c*. The synchronization signals S2*a*, S2*b*, S2*c* are pulse waves. The time interval Δt is provided between the rising point of time of the pulse of the synchronization signal S2*a* and the rising point of time of the pulse of the synchronization signal S2*b*. The time interval Δt is provided between the rising point of time of the pulse of the synchronization signal S2*b* and the rising point of time of the pulse of the synchronization signal S2*c*. The time interval Δt is provided between the rising point of time of the pulse of the synchronization signal S2*c* and the rising point of time of the pulse of the synchronization signal S2*a*.

As described above, the data Ak, Bk, Ck, which configure the time series data, are successively aligned while providing the time intervals Δt. On this account, if the first time division multiplex signal is accessed at the rising point of time of the pulse of the synchronization signal S2*a*, it is possible to acquire the driving waveform signal Pa which corresponds to the data Ak and which represents the driving waveform A. If the first time division multiplex signal is accessed at the rising point of time of the pulse of the synchronization signal S2*b*, it is possible to acquire the driving waveform signal Pb which corresponds to the data Bk and which represents the driving waveform B. If the first time division multiplex signal is accessed at the rising point of time of the pulse of the synchronization signal S2*c*, it is possible to acquire the driving waveform signal Pc which corresponds to the data Ck and which represents the driving waveform C.

Further, the data Dk, Ek, Fk, which configure the time series data, are successively aligned while providing the time intervals Δt. On this account, if the second time division multiplex signal is accessed at the rising point of time of the pulse of the synchronization signal S2*a*, it is possible to acquire the driving waveform signal Pd which corresponds to the data Dk and which represents the driving waveform D. If the second time division multiplex signal is accessed at the rising point of time of the pulse of the synchronization signal S2*b*, it is possible to acquire the driving waveform signal Pe which corresponds to the data Ek and which represents the driving waveform E. If the second time division multiplex signal is accessed at the rising point of time of the pulse of the synchronization signal S2*c*, it is possible to acquire the driving waveform signal Pf which corresponds to the data Fk and which represents the driving waveform F.

Further, the data Gk, Hk, Il, which configure the time series data, are successively aligned while providing the time intervals Δt. On this account, if the third time division multiplex signal is accessed at the rising point of time of the pulse of the synchronization signal S2*a*, it is possible to acquire the driving waveform signal Pg which corresponds to the data Gk and which represents the driving waveform G. If the third time division multiplex signal is accessed at the rising point of time of the pulse of the synchronization signal S2*b*, it is possible to acquire the driving waveform signal Ph which corresponds to the data Hk and which represents the driving waveform H. If the third time division multiplex signal is accessed at the rising point of time of the pulse of the synchronization signal S2*c*, it is possible to acquire the driving waveform signal Pi which corresponds to the data Ik and which represents the driving waveform I.

The switch group 54 opens and closes the selected nth a-switch 54*a*(n), the selected nth b-switch 54*b*(n), or the selected nth c-switch 54*c*(n) at the opening-closing timing indicated by the selected synchronization signal S2*a* to S2*c*.

Figure 12:
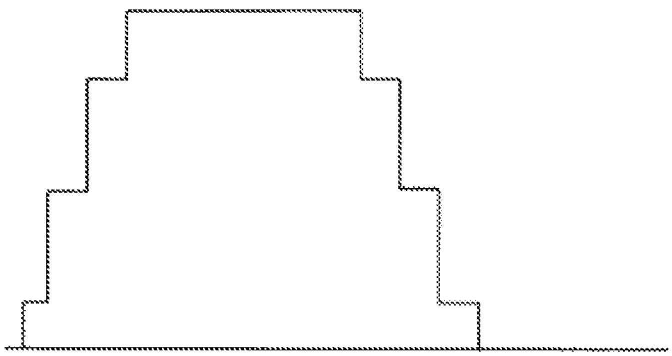
FIG. 12 is a schematic drawing of the driving waveform inputted into an actuator in accordance with the opening and closing of an nth a-switch.
Figure 12:
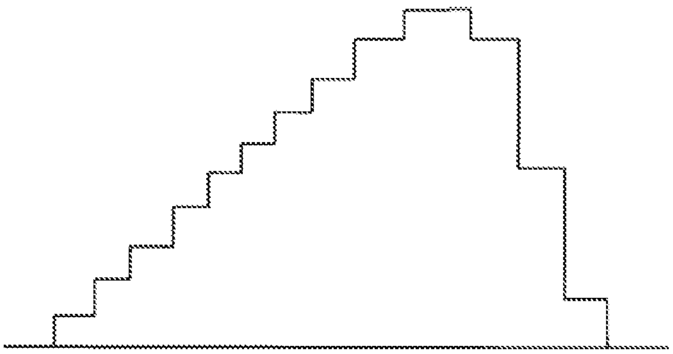
Figure 12:
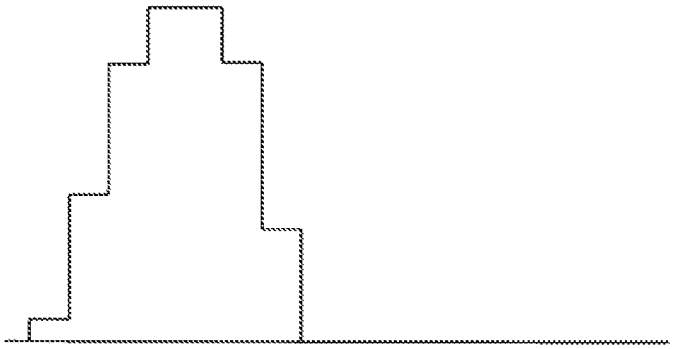

FIG. 12 is a schematic drawing of the driving waveform inputted into the actuator 88 by opening and closing of the nth a-switch 54*a*(n). When the first time division multiplex signal and the synchronization signal S2*a* are selected, then the switch group 54 closes the nth a-switch 54*a*(n) if the pulse of the synchronization signal S2*a* is in the high level interval (period), or the switch group 54 opens the nth a-switch 54*a*(n) if the pulse of the synchronization signal S2*a* is in the low level interval. The electric charge, which is applied to the individual electrode 85 when the nth a-switch 54*a*(n) is closed, is retained. Thus, as depicted in FIG. 12, the driving waveform A1 is inputted into the actuator 88. In other words, the driving waveform signal Pa is separated from the first time division multiplex signal, and the actuator 88 is driven by the driving waveform signal Pa.

When the first time division multiplex signal and the synchronization signal S2*b* are selected, then the switch group 54 closes the nth a-switch 54*a*(n) if the pulse of the synchronization signal S2*b* is in the high level interval, or the switch group 54 opens the nth a-switch 54*a*(n) if the pulse of the synchronization signal S2*b* is in the low level interval. The electric charge, which is applied to the individual electrode 85 when the nth a-switch 54*a*(n) is closed, is retained. Thus, as depicted in FIG. 12, the driving waveform B1 is inputted into the actuator 88. In other words, the driving waveform signal Pb is separated from the first time division multiplex signal, and the actuator 88 is driven by the driving waveform signal Pb.

When the first time division multiplex signal and the synchronization signal S2*c* are selected, then the switch group 54 closes the nth a-switch 54*a*(n) if the pulse of the synchronization signal S2*c* is in the high level interval, or the switch group 54 opens the nth a-switch 54*a*(n) if the pulse of the synchronization signal S2*c* is in the low level interval. The electric charge, which is applied to the individual electrode 85 when the nth a-switch 54*a*(n) is closed, is retained. Thus, as depicted in FIG. 12, the driving waveform C1 is inputted into the actuator 88. In other words, the driving waveform signal Pc is separated from the first time division multiplex signal, and the actuator 88 is driven by the driving waveform signal Pc.

In the same manner as described above, when the second time division multiplex signal and the synchronization signal S2*a* are selected, then the nth b-switch 54*b*(n) is opened and closed, the driving waveform signal Pd is separated from the second time division multiplex signal, and the actuator 88 is driven by the driving waveform signal Pd. When the second time division multiplex signal and the synchronization signal S2*b* are selected, then the nth b-switch 54*b*(n) is opened and closed, the driving waveform signal Pe is separated from the second time division multiplex signal, and the actuator 88 is driven by the driving waveform signal Pe. When the second time division multiplex signal and the synchronization signal S2*c* are selected, then the nth b-switch 54*b*(n) is opened and closed, the driving waveform signal Pf is separated from the second time division multiplex signal, and the actuator 88 is driven by the driving waveform signal Pf.

When the third time division multiplex signal and the synchronization signal S2*a* are selected, then the nth c-switch 54*c*(n) is opened and closed, the driving waveform signal Pg is separated from the third time division multiplex signal, and the actuator 88 is driven by the driving waveform signal Pg. When the third time division multiplex signal and the synchronization signal S2*b* are selected, then the nth c-switch 54*c*(n) is opened and closed, the driving waveform signal Ph is separated from the third time division multiplex signal, and the actuator 88 is driven by the driving waveform signal Ph. When the third time division multiplex signal and the synchronization signal S2*c* are selected, then the nth c-switch 54*c*(n) is opened and closed, the driving waveform signal Pi is separated from the third time division multiplex signal, and the actuator 88 is driven by the driving waveform signal Pi.

Figure 13:
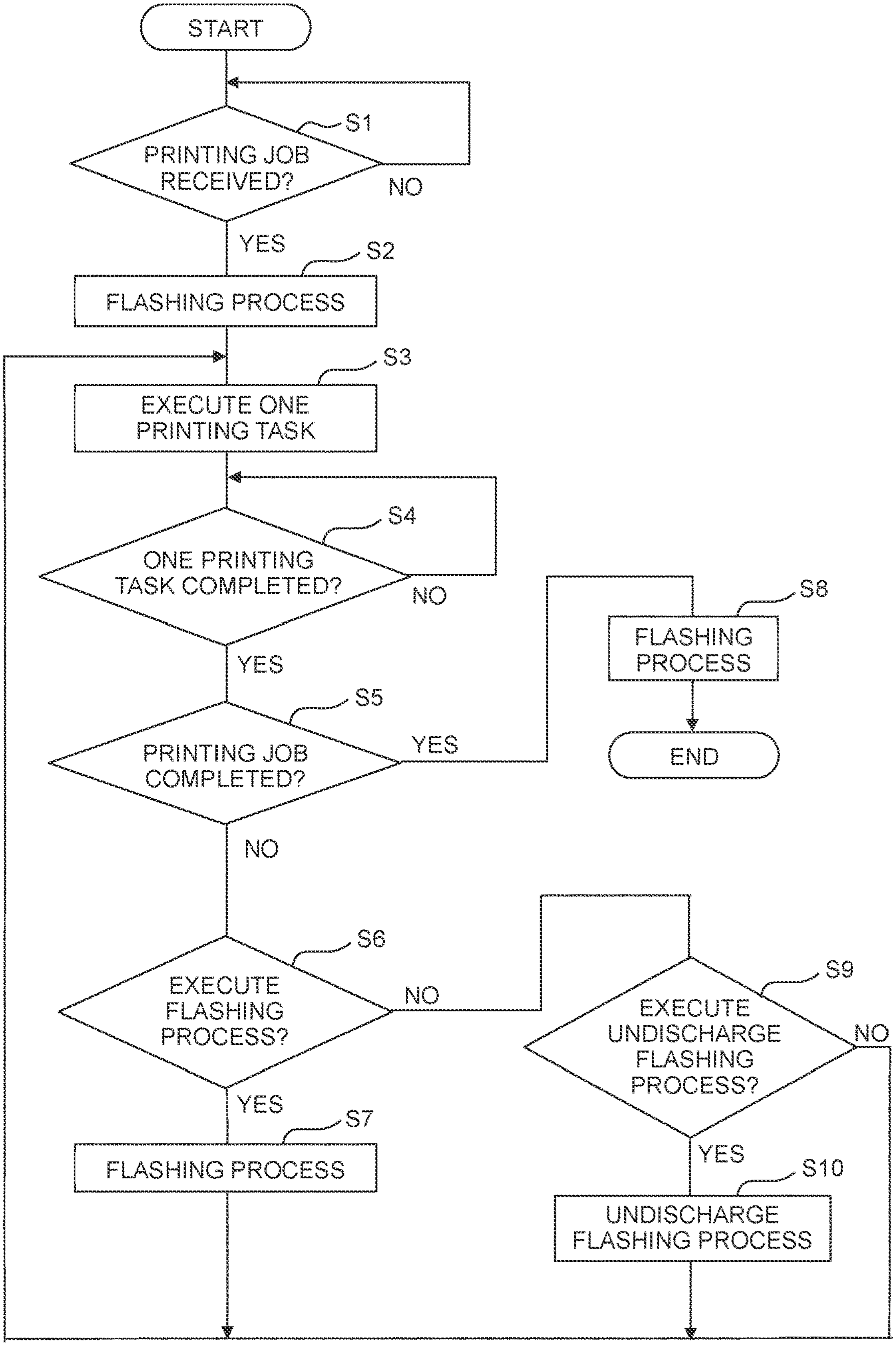
FIG. 13 is a flow chart to explain a printing process performed by the controller.

FIG. 13 is a flow chart to explain a printing process performed by the controller 50. The controller 50 determines whether or not the printing job is received from the external apparatus 100 (S1). If the printing job is not received (S1: NO), the controller 50 returns the process to Step S1. If the printing job is received (S1: YES), the controller 50 executes the flashing process (S2). The flashing process is the process in which the inks are discharged from the nozzles 80 for any purpose other than the purpose of the printing. The flashing process is executed, for example, at or above the flashing receiver 21.

The controller 50 executes one printing task (S3). The printing task is the unit for constructing the printing job. Specifically, the printing task is the liquid discharging process performed during the period in which the ink-jet head 8 is moved rightwardly or leftwardly in an amount corresponding to the left-right width of the recording paper 200. Subsequently, the controller 50 determines whether or not one printing task is completed (S4). Note that the carriage 6 performs one scanning in one printing task. If one printing task is not completed (S4: NO), the process is returned to Step S4. If one printing task is completed (S4: YES), the controller 50 determines whether or not the printing job is completed (S5).

If the printing job is completed (S5: YES), then the controller 50 executes the flashing process (S8), and the printing process is terminated. If the printing job is not completed (S5: NO), the controller 50 determines whether or not the timing arrives to perform the flashing process (S6). The flashing process is periodically executed for the purpose of the maintenance of the nozzles 80. If the timing arrives to perform the flashing process (S6: YES), then the controller 50 executes the flashing process (S7), and the process is returned to Step S3. If the timing does not arrive to perform the flashing process (S6: NO), the controller 50 determines whether or not the timing arrives to execute the undischarge flashing process (S9).

The undischarge flashing process is the process to be performed in order to prevent the nozzles 80 from being dried without performing the discharge of the ink. In particular, the piezoelectric member 83 is slightly deformed to swing the surface (meniscus) of the ink in this process. For example, the process is executed by using the cap 20. The undischarge flashing process is periodically executed. If the timing arrives to execute the undischarge flashing process (S9: YES), then the controller 50 executes the undischarge flashing process (S10), and the process is returned to Step S3. In Step S10, the controller 50 supplies, to the individual electrode 85, the driving waveform corresponding to the undischarge flashing process. If the timing does not arrive to execute the undischarge flashing process (S9: NO), the controller 50 returns the process to Step S3.

The controller 50 may perform the generation of the time division multiplex signal and the separation of the driving waveform signal in any one of the term during the execution of the flashing process (S2, S7, S8) or during the execution of the printing task (S3). That is, the generation of the time division multiplex signal and the separation of the driving waveform signal may be performed during the driving of the actuator 88.

In the printing apparatus according to the first embodiment, the first time division multiplex signal is generated on the basis of the first data which represents the driving waveform A and the second data which represents the driving waveform B different from the driving waveform A, the second time division multiplex signal is generated on the basis of the third data which represents the driving waveform D and the fourth data which represents the driving waveform E different from the driving waveform D, and the third time division multiplex signal is generated on the basis of the fifth data which represents the driving waveform G and the sixth data which represents the driving waveform H different from the driving waveform G. The first driving waveform signal Pa which represents the driving waveform A or the second driving waveform signal Pb which represents the driving waveform B is separated from the generated first time division multiplex signal. The third driving waveform signal Pd which represents the driving waveform D or the fourth driving waveform signal Pe which represents the driving waveform E is separated from the generated second time division multiplex signal. The fifth driving waveform signal Pg which represents the driving waveform G or the sixth driving waveform signal Ph which represents the driving waveform H is separated from the generated third time division multiplex signal. The actuator 88 is driven by any one of the first driving waveform signal Pa to sixth driving waveform signal Ph. It is possible to adjust the amplitude of the driving waveform applied to the actuator 88 by selecting any one of the first driving waveform signal Pa to sixth driving waveform signal Ph. Further, only the cycle of any one selected driving waveform is included in one cycle for printing one pixel, and the cycle of unselected driving waveform is not included in one cycle for printing one pixel. On this account, it is possible to reduce the waiting time of the nozzle.

The respective maximum amplitudes of the driving waveform A to the driving waveform C are within the first range Q1 on the basis of the first amplitude value P1. Therefore, it is possible to provide the common power source voltage to be used for the driving waveform A to the driving waveform C. Further, the respective maximum amplitudes of the driving waveform D to the driving waveform F are within the second range Q2 on the basis of the second amplitude value P2. Therefore, it is possible to provide the common power source voltage to be used for the driving waveform D to the driving waveform F. Further, the respective maximum amplitudes of the driving waveform G to the driving waveform I are within the third range Q3 on the basis of the third amplitude value P3. Therefore, it is possible to provide the common power source voltage to be used for the driving waveform G to the driving waveform I. On this account, it is unnecessary to prepare the power source voltage depending on each of the driving waveforms. It is possible to reduce the number of the power source voltages.

Second Embodiment

Figure 14:
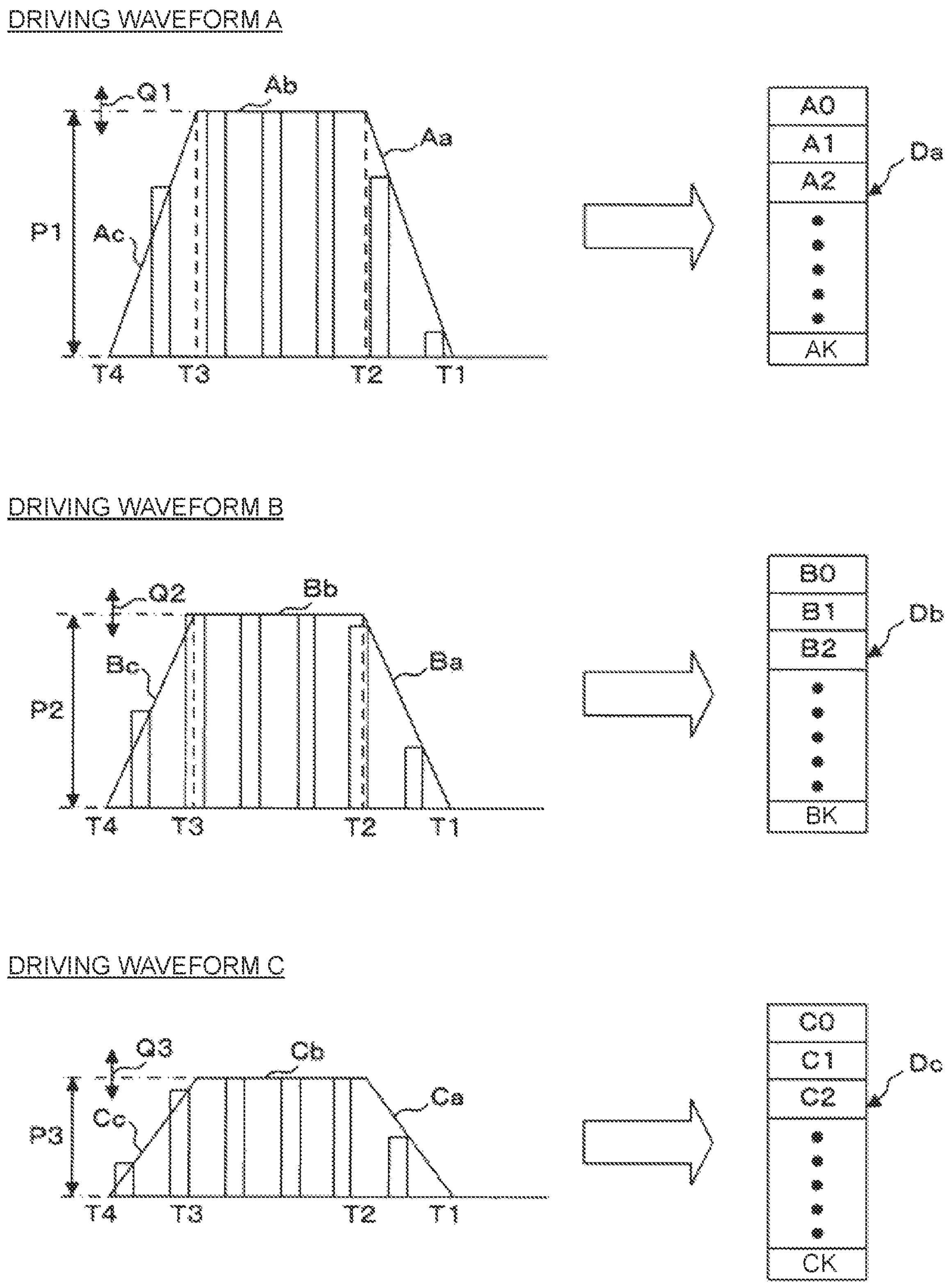
FIG. 14 is an explanatory drawing to explain examples of the relationships between the driving waveforms A, B, C and the driving waveform data Da, Db, Dc.

The present disclosure will be explained below on the basis of the drawings which depict a printing apparatus according to a second embodiment. Constitutive components according to the second embodiment, which are the same as or equivalent to the constitutive components according to the first embodiment, are designated by the same reference numerals (provided that the driving waveforms A to I and the data Da to Di referred to in the following explanation are not necessarily the same as the driving waveforms A to I and the data Da to Di referred to in the explanation of the first embodiment), any detailed explanation of which will be omitted. FIG. 14 is an explanatory drawing to explain examples of the relationships between the driving waveforms A, B, C and the driving waveform data Da, Db, Dc.

The driving waveform A is provided with a rising portion Aa in which the voltage gradually increases until arrival at a maximum amplitude, an intermediate portion Ab in which the voltage maintains the maximum amplitude, and a falling portion Ac in which the voltage gradually decreases from the maximum amplitude. The rising portion Aa appears between the first point of time T1 and the second point of time T2. The intermediate portion Ab appears between the second point of time T2 and the third point of time T3. The falling portion Ac appears between the third point of time T3 and the fourth point of time T4.

The driving waveform A depicted in FIG. 14 is the waveform of one cycle. That is, the driving waveform A has, within one cycle of the driving waveform A, the rising portion Aa, the falling portion Ac, and the intermediate portion Ab between the rising portion Aa and the falling portion Ac. One end of the intermediate portion Ab is directly connected to the upper end of the rising portion Aa, and the other end of the intermediate portion Ab is directly connected to the upper end of the falling portion Ac. Such explanation applies similarly to driving waveforms B to I described below. In the present invention, the wording of "an intermediate portion between the rising portion and the falling portion" means the intermediate portion defined between the rising portion and the falling portion within one cycle of the driving waveform. For example, in the embodiment, one cycle of the driving waveform corresponds to one crest or ridge ranging from the minimum voltage to the maximum voltage and from the maximum voltage back to the minimum voltage.

The driving waveform B is provided with a rising portion Ba in which the voltage gradually increases until arrival at a maximum amplitude, an intermediate portion Bb in which the voltage maintains the maximum amplitude, and a falling portion Bc in which the voltage gradually decreases from the maximum amplitude. The rising portion Ba appears between the first point of time T1 and the second point of time T2. The intermediate portion Bb appears between the second point of time T2 and the third point of time T3. The falling portion Bc appears between the third point of time T3 and the fourth point of time T4.

The driving waveform C is provided with a rising portion Ca in which the voltage gradually increases until arrival at a maximum amplitude, an intermediate portion Cb in which the voltage maintains the maximum amplitude, and a falling portion Cc in which the voltage gradually decreases from the maximum amplitude. The rising portion Ca appears between the first point of time T1 and the second point of time T2. The intermediate portion Cb appears between the second point of time T2 and the third point of time T3. The falling portion Cc appears between the third point of time T3 and the fourth point of time T4.

As described above, any one of the respective rising portions Aa, Ba, Ca of the driving waveforms A, B, C appears between the first point of time T1 and the second point of time T2, any one of the intermediate portions Ab, Bb, Cb appears between the second point of time T2 and the third point of time T3, and any one of the falling portions Ac, Bc, Cc appears between the third point of time T3 and the fourth point of time T4. In this way, the points of time and the lengths, at which the rising portion, the intermediate portion, and the falling portion appear, are common to one another. Therefore, the shapes of the driving waveforms A, B, C are considered to be approximate or similar to one another.

Respective inclinations of the rising portions Aa, Ba, Ca are within a range Y1 on the basis of an inclination value M1. The range Y1 refers to, for example, a range of "inclination value M1±y1". The magnitude of y1 is sufficiently smaller than the magnitude of the inclination value M1. Respective inclinations of the falling portions Ac, Bc, Cc are within a range Y2 on the basis of an inclination value M2. The range Y2 refers to, for example, a range of "inclination value M2±y2". The magnitude of y2 is sufficiently smaller than the magnitude of the inclination value M2. The inclinations of the rising portions Aa, Ba, Ca are common to one another and the inclinations of the falling portions Ac, Bc, Cc are common to one another. Therefore, the shapes of the driving waveforms A, B, C are considered to be approximate or similar to one another.

Further, the mean square error with respect to the amplitude of the driving waveform A, B, C is smaller than a predetermined threshold value. For example, when the average value of the amplitudes of the driving waveforms A, B, C is calculated, and the mean square error is calculated for each of the amplitudes of the driving waveforms A to C with respect to the average value, then the mean square error of each of the driving waveforms A to C is smaller than the threshold value. Therefore, the shapes of the driving waveforms A, B, C are considered to be approximate or similar to one another.

Respective maximum amplitudes of the driving waveforms A, B, C are different from each other. For example, the maximum amplitude of the driving waveform A is within a first range Q1 on the basis of a first amplitude value P1, the maximum amplitude of the driving waveform B is within a second range Q2 on the basis of a second amplitude value P2, and the maximum amplitude of the driving waveform C is within a third range Q3 on the basis of a third amplitude value P3.

The data, which is obtained by converting the driving waveform A into a digital signal by using a predetermined sampling frequency, is the driving waveform data Da. The data, which is obtained by converting the driving waveform B into a digital signal by using a predetermined sampling frequency, is the driving waveform data Db. The data, which is obtained by converting the driving waveform C into a digital signal by using a predetermined sampling frequency, is the driving waveform data Dc.

Figure 15:
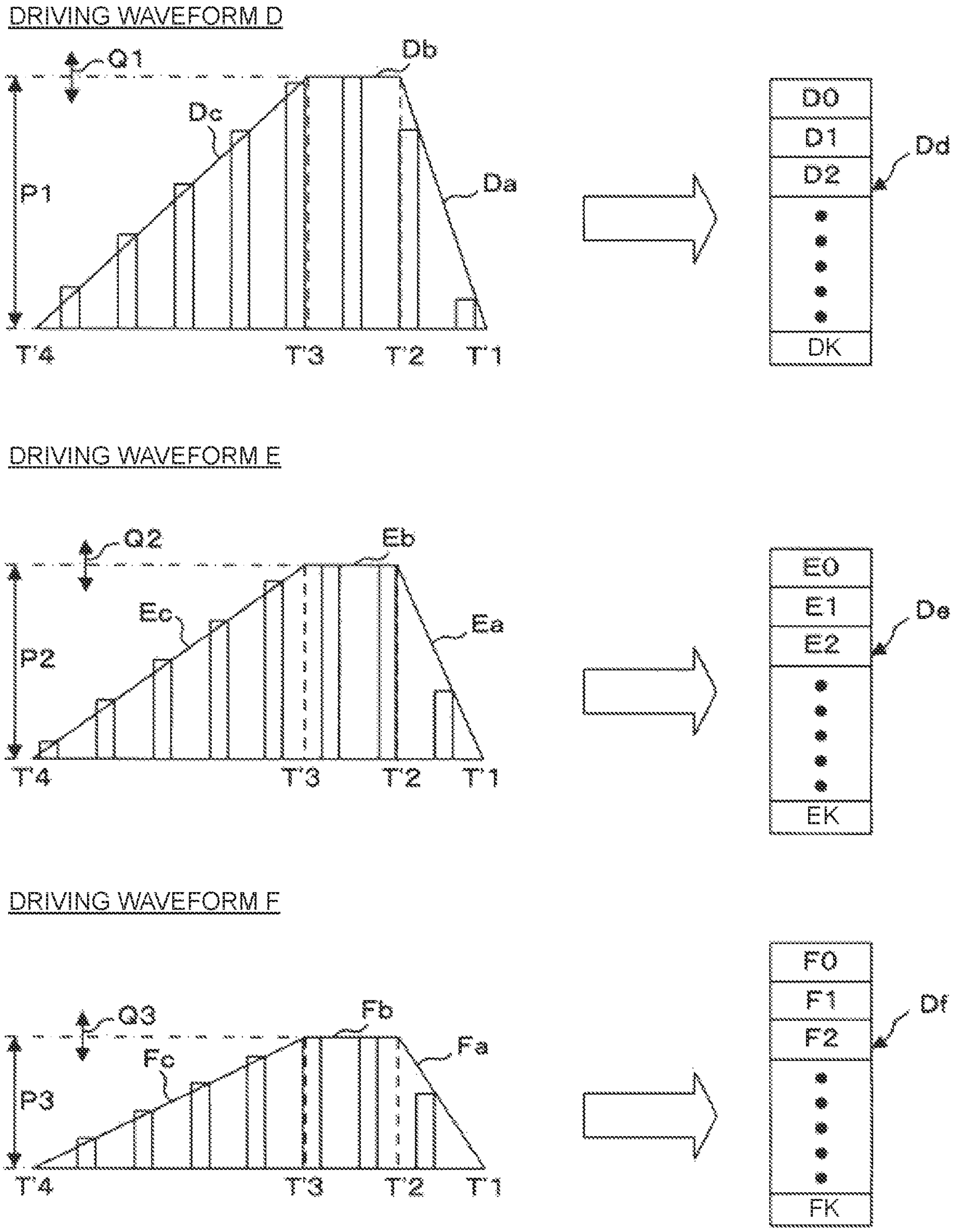
FIG. 15 is an explanatory drawing to explain examples of the relationships between the driving waveforms D, E, F and the driving waveform data Dd, De, Df.

FIG. 15 is an explanatory drawing to explain examples of the relationships between the driving waveforms D, E, F and the driving waveform data Dd, De, Df.

The driving waveform D is provided with a rising portion Da in which the voltage gradually increases until arrival at a maximum amplitude, an intermediate portion Db in which the voltage maintains the maximum amplitude, and a falling portion Dc in which the voltage gradually decreases from the maximum amplitude. The rising portion Da appears between the first point of time T1' and the second point of time T2'. The intermediate portion Db appears between the second point of time T2' and the third point of time T3'. The falling portion Dc appears between the third point of time T3' and the fourth point of time T4'.

The driving waveform E is provided with a rising portion Ea in which the voltage gradually increases until arrival at a maximum amplitude, an intermediate portion Eb in which the voltage maintains the maximum amplitude, and a falling portion Ec in which the voltage gradually decreases from the maximum amplitude. The rising portion Ea appears between the first point of time T1' and the second point of time T2'. The intermediate portion Eb appears between the second point of time T2' and the third point of time T3'. The falling portion Ec appears between the third point of time T3' and the fourth point of time T4'.

The driving waveform F is provided with a rising portion Fa in which the voltage gradually increases until arrival at a maximum amplitude, an intermediate portion Fb in which the voltage maintains the maximum amplitude, and a falling portion Fc in which the voltage gradually decreases from the maximum amplitude. The rising portion Fa appears between the first point of time T1' and the second point of time T2'. The intermediate portion Fb appears between the second point of time T2' and the third point of time T3'. The falling portion Fc appears between the third point of time T3' and the fourth point of time T4'.

As described above, any one of the respective rising portions Da, Ea, Fa of the driving waveforms D, E, F appears between the first point of time T1' and the second point of time T2', any one of the intermediate portions Db, Eb, Fb appears between the second point of time T2' and the third point of time T3', and any one of the falling portions Dc, Ec, Fc appears between the third point of time T3' and the fourth point of time T4'. In this way, the points of time and the lengths, at which the rising portion, the intermediate portion, and the falling portion appear, are common to one another. Therefore, the shapes of the driving waveforms D, E, F are considered to be approximate or similar to one another.

Respective inclinations of the rising portions Da, Ea, Fa are within a range Y3 on the basis of an inclination value M3. The range Y3 refers to, for example, a range of "inclination value M3±y3". The magnitude of y3 is sufficiently smaller than the magnitude of the inclination value M3. Respective inclinations of the falling portions Dc, Ec, Fc are within a range Y4 on the basis of an inclination value M4. The range Y4 refers to, for example, a range of "inclination value M4±y4". The magnitude of y4 is sufficiently smaller than the magnitude of the inclination value M4. The inclinations of the rising portions Da, Ea, Fa are common to one another and the inclinations of the falling portions Dc, Ec, Fc are common to one another. Therefore, the shapes of the driving waveforms D, E, F are considered to be approximate or similar to one another.

Further, the mean square error with respect to the amplitude of the driving waveform D, E, F is smaller than a predetermined threshold value. For example, when the average value of the amplitudes of the driving waveforms D, E, F is calculated, and the mean square error is calculated for each of the amplitudes of the driving waveforms D to F with respect to the average value, then the mean square error of each of the driving waveforms D to F is smaller than the threshold value. Therefore, the shapes of the driving waveforms D, E, F are considered to be approximate or similar to one another.

Respective maximum amplitudes of the driving waveforms D, E, F are different from each other. For example, the maximum amplitude of the driving waveform D is within a first range Q1 on the basis of a first amplitude value P1, the maximum amplitude of the driving waveform E is within a second range Q2 on the basis of a second amplitude value P2, and the maximum amplitude of the driving waveform F is within a third range Q3 on the basis of a third amplitude value P3.

The data, which is obtained by converting the driving waveform D into a digital signal by using a predetermined sampling frequency, is the driving waveform data Dd. The data, which is obtained by converting the driving waveform E into a digital signal by using a predetermined sampling frequency, is the driving waveform data De. The data, which is obtained by converting the driving waveform F into a digital signal by using a predetermined sampling frequency, is the driving waveform data Df.

Figure 16:
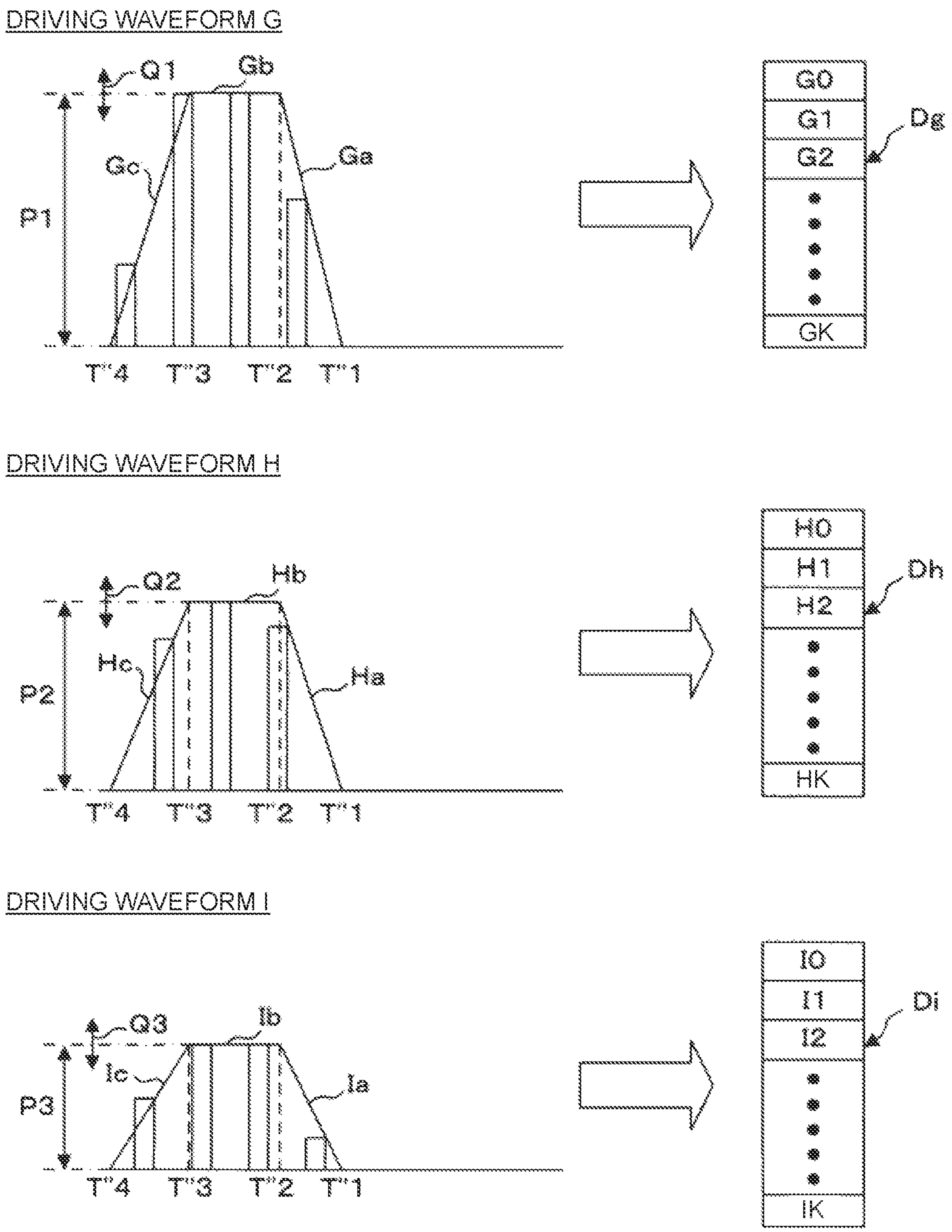
FIG. 16 is an explanatory drawing to explain examples of the relationships between the driving waveforms G, H, I and the driving waveform data Dg, Dh, Di.

FIG. 16 is an explanatory drawing to explain examples of the relationships between the driving waveforms G, H, I and the driving waveform data Dg, Dh, Di.

The driving waveform G is provided with a rising portion Ga in which the voltage gradually increases until arrival at a maximum amplitude, an intermediate portion Gb in which the voltage maintains the maximum amplitude, and a falling portion Gc in which the voltage gradually decreases from the maximum amplitude. The rising portion Ga appears between the first point of time Ti "and the second point of time T2". The intermediate portion Gb appears between the second point of time T2" and the third point of time T3". The falling portion Gc appears between the third point of time T3" and the fourth point of time T4".

The driving waveform H is provided with a rising portion Ha in which the voltage gradually increases until arrival at a maximum amplitude, an intermediate portion Hb in which the voltage maintains the maximum amplitude, and a falling portion Hc in which the voltage gradually decreases from the maximum amplitude. The rising portion Ha appears between the first point of time Ti "and the second point of time T2". The intermediate portion Hb appears between the second point of time T2" and the third point of time T3". The falling portion Hc appears between the third point of time T3" and the fourth point of time T4".

The driving waveform I is provided with a rising portion Ia in which the voltage gradually increases until arrival at a maximum amplitude, an intermediate portion Ib in which the voltage maintains the maximum amplitude, and a falling portion Ic in which the voltage gradually decreases from the maximum amplitude. The rising portion Ia appears between the first point of time T1" and the second point of time T2". The intermediate portion Ib appears between the second point of time T2" and the third point of time T3". The falling portion Ic appears between the third point of time T3" and the fourth point of time T4".

As described above, any one of the respective rising portions Ga, Ha, Ia of the driving waveforms G, H, I appears between the first point of time T1" and the second point of time T2", any one of the intermediate portions Gb, Hb, Ib appears between the second point of time T2" and the third point of time T3", and any one of the falling portions Gc, Hc, Ic appears between the third point of time T3" and the fourth point of time T4". In this way, the points of time and the lengths, at which the rising portion, the intermediate portion, and the falling portion appear, are common to one another. Therefore, the shapes of the driving waveforms G, H, I are considered to be approximate or similar to one another.

Respective inclinations of the rising portions Ga, Ha, Ia are within a range Y5 on the basis of an inclination value M5. The range Y5 refers to, for example, a range of "inclination value M5±y5". The magnitude of y5 is sufficiently smaller than the magnitude of the inclination value M5. Respective inclinations of the falling portions Gc, Hc, Ic are within a range Y6 on the basis of an inclination value M6. The range Y6 refers to, for example, a range of "inclination value M6±y6". The magnitude of y6 is sufficiently smaller than the magnitude of the inclination value M6. The inclinations of the rising portions Ga, Ha, Ia are common to one another and the inclinations of the falling portions Gc, Hc, Ic are common to one another. Therefore, the shapes of the driving waveforms G, H, I are considered to be approximate or similar to one another.

Further, the mean square error with respect to the amplitude of the driving waveform G, H, I is smaller than a predetermined threshold value. For example, when the average value of the amplitudes of the driving waveforms G, H, I is calculated, and the mean square error is calculated for each of the amplitudes of the driving waveforms G to I with respect to the average value, then the mean square error of each of the driving waveforms G to I is smaller than the threshold value. Therefore, the shapes of the driving waveforms G, H, I are considered to be approximate or similar to one another.

Respective maximum amplitudes of the driving waveforms G, H, I are different from each other. For example, the maximum amplitude of the driving waveform G is within a first range Q1 on the basis of a first amplitude value P1, the maximum amplitude of the driving waveform H is within a second range Q2 on the basis of a second amplitude value P2, and the maximum amplitude of the driving waveform I is within a third range Q3 on the basis of a third amplitude value P3.

The data, which is obtained by converting the driving waveform G into a digital signal by using the predetermined sampling frequency, is the driving waveform data Dg. The data, which is obtained by converting the driving waveform H into a digital signal by using the predetermined sampling frequency, is the driving waveform data Dh. The data, which is obtained by converting the driving waveform I into a digital signal by using the predetermined sampling frequency, is the driving waveform data Di.

Figure 17:
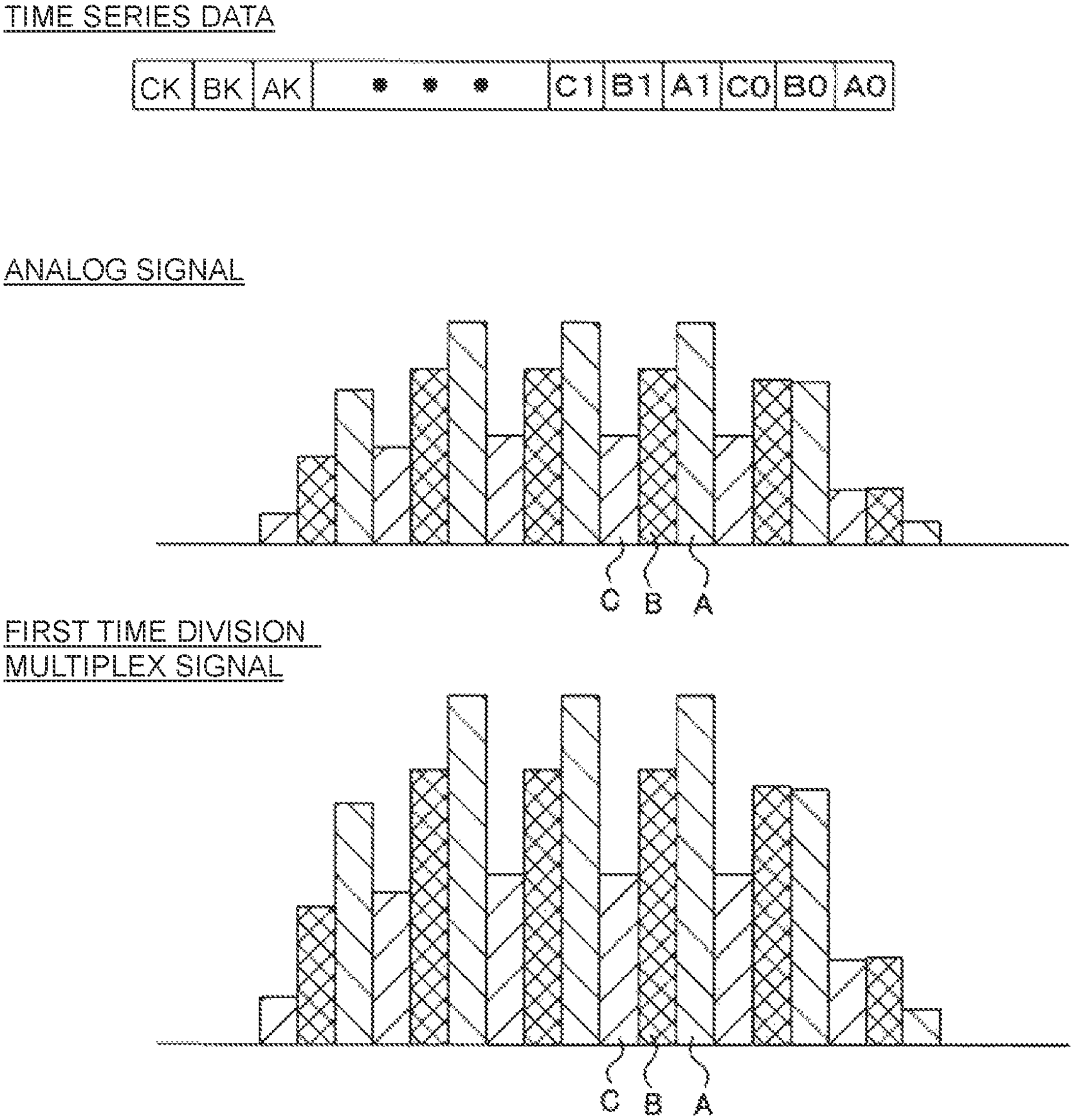
FIG. 17 is an explanatory drawing to explain examples of the time series data, the analog signal, and the first time division multiplex signal.

FIG. 17 is an explanatory drawing to explain examples of the time series data, the analog signal, and the first time division multiplex signal. In FIG. 17, the characters of A, B, and C indicate the correspondence to the driving waveforms A, B, and C respectively. In the same manner as the first embodiment, the control circuit 51 accesses the memory 55 to acquire the driving waveform data Da, Db, Dc and prepare the time series data which is outputted to the first D/A converter 52*a*. The first D/A converter 52*a* converts the time series data into the analog signal which is outputted to the first amplifier 53*a*. The first amplifier 53*a* amplifies the inputted analog signal, and the amplified signal is outputted to the switch group 54. As depicted in FIG. 17, the analog signal, which has been amplified by the first amplifier 53*a*, configures the first time division multiplex signal.

Figure 18:
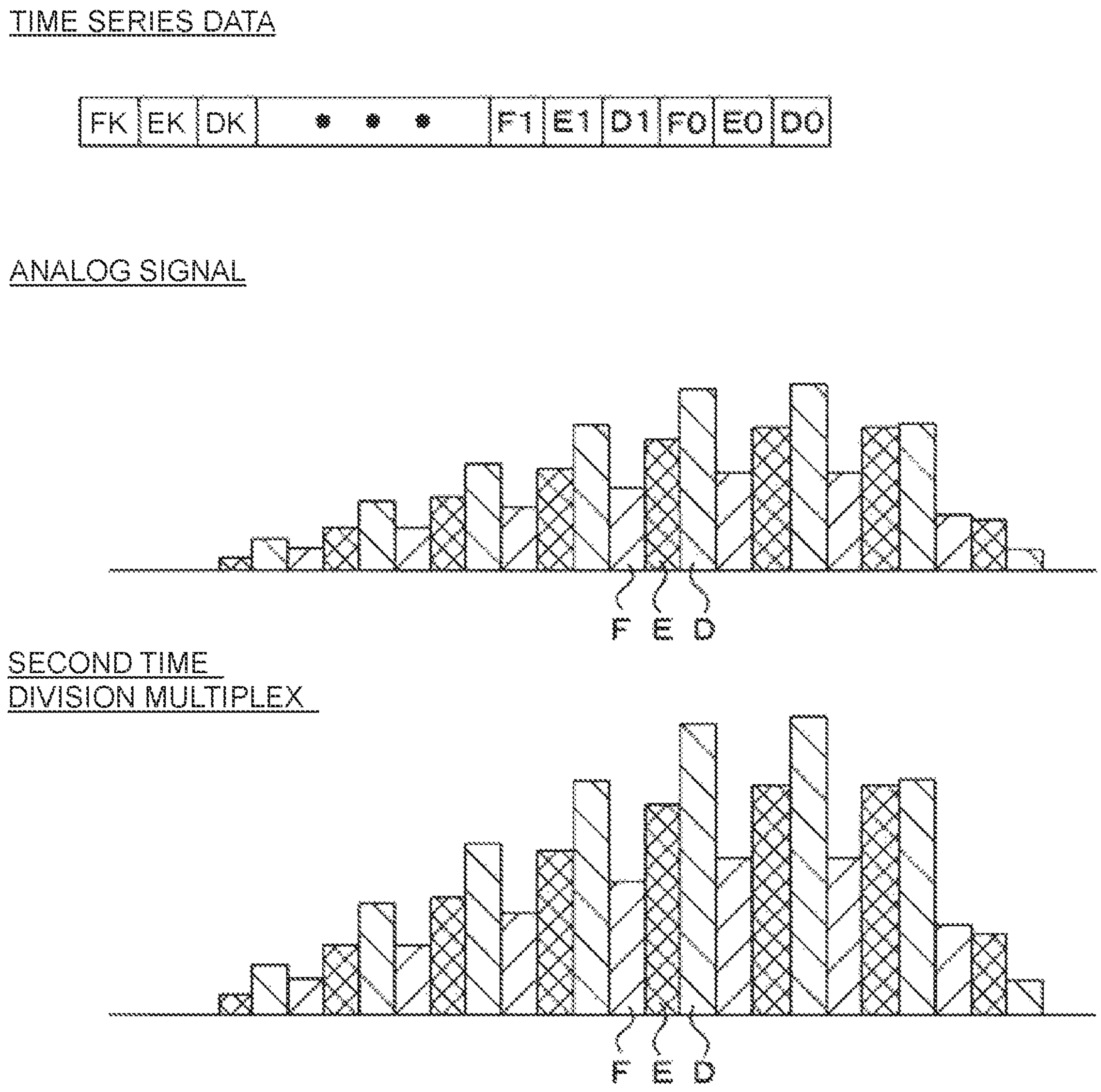
FIG. 18 is an explanatory drawing to explain examples of the time series data, the analog signal, and the second time division multiplex signal.

FIG. 18 is an explanatory drawing to explain examples of the time series data, the analog signal, and the second time division multiplex signal. In FIG. 18, the characters of D, E, and F indicate the correspondence to the driving waveform data D, E, and F respectively. In the same manner as the first embodiment, the control circuit 51 accesses the memory 55 to acquire the driving waveform data Dd, De, Df and prepare the time series data which is outputted to the second D/A converter 52*b*. The second D/A converter 52*b* converts the time series data into the analog signal which is outputted to the second amplifier 53*b*. The second amplifier 53*b* amplifies the inputted analog signal, and the amplified signal is outputted to the switch group 54. As depicted in FIG. 18, the analog signal, which has been amplified by the second amplifier 53*b*, configures the second time division multiplex signal.

Figure 19:
FIG. 19 is an explanatory drawing to explain examples of the time series data, the analog signal, and the third time division multiplex signal.
Figure 19:
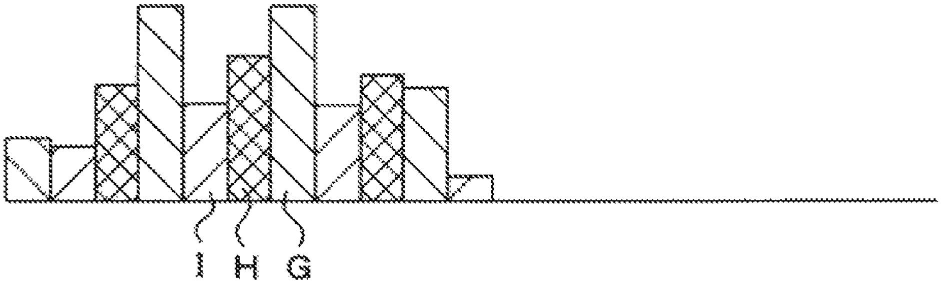
Figure 19:
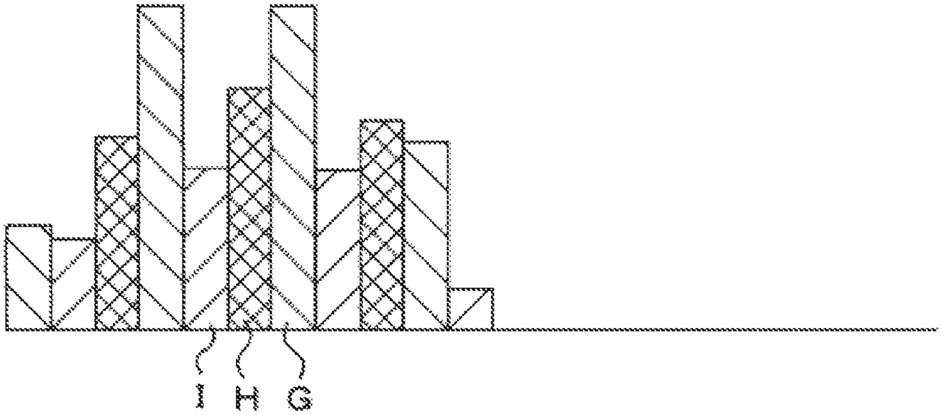

FIG. 19 is an explanatory drawing to explain examples of the time series data, the analog signal, and the third time division multiplex signal. In FIG. 19, the characters of G, H, and I indicate the correspondence to the driving waveforms G, H, and I respectively. In the same manner as the first embodiment, the control circuit 51 accesses the memory 55 to acquire the driving waveform data Dg, Dh, Di and prepare the time series data which is outputted to the third D/A converter 52*c*. The third D/A converter 52*c* converts the time series data into the analog signal which is outputted to the third amplifier 53*c*. The third amplifier 53*c* amplifies the inputted analog signal, and the amplified signal is outputted to the switch group 54. As depicted in FIG. 19, the analog signal, which has been amplified by the third amplifier 53*c*, configures the third time division multiplex signal.

In the second embodiment, the operation is performed in the same manner as the first embodiment. That is, the control circuit 51 outputs the switch control signal S1 and the synchronization signal S2 to the switch group 54. The desired driving waveform signal is separated from the first time division multiplex signal, the second time division multiplex signal, or the third time division multiplex signal. The actuator 88 is driven in accordance with the separated driving waveform signal.

In the printing apparatus according to the second embodiment, for example, the first time division multiplex signal is generated based on the driving waveforms A, B, C, and the first time division multiplex signal is amplified by the first amplifier 53*a*. The sampled signals of each of the driving waveforms A, B, C are successively aligned in the first time division multiplex signal. The sampled signals are successively inputted into the first amplifier 53*a*. The shapes of the driving waveforms A, B, C are approximate or similar to one another. Therefore, the difference in the amplitude is small among the sampled signals. Thus, it is unnecessary to greatly change the output voltage of the first amplifier 53*a* in a short period of time. On this account, the current, which is supplied to the first amplifier 53*a* for the purpose of amplification, can be prevented from being extremely increased.

In the invention, it is defined that shapes of two driving waveforms are approximate or similar to each other, if at least one of the following conditions (1) to (3) is met.

(1) Points of time and lengths, at which the rising portions of the two driving waveforms appear, are common to one another; points of time and lengths, at which the intermediate portions of the two driving waveforms appear, are common to one another; and points of time and lengths, at which the falling portions of the two driving waveforms appear, are common to one another.

(2) Inclinations of the rising portions of the two driving waveforms are common to one another; and inclinations of the falling portions of the two driving waveforms are common to one another.

(3) Mean square error with respect to amplitude of each of the two driving waveforms is smaller than a predetermined threshold value.

Further, when the driving waveform A is separated from the first time division multiplex signal, then the separation timing may be deviated, and the signal of the driving waveform B or C may be separated partially erroneously in some cases. Even in such a situation, the difference in the amplitude is small among the respective sampled signals. Therefore, it is possible for the separated waveform to retain the shape approximate to the driving waveform A.

Note that the data, which are sampled from the three driving waveforms, are aligned in the order starting from one having the large maximum amplitude to generate the time division multiplex signal. However, the data may be aligned in an order starting from one having the small maximum amplitude. Alternatively, the data may be aligned in an order in which the magnitudes of the maximum amplitudes are middle, large, and small.

In the embodiment described above, the three signals are combined to generate the time division multiplex signal. However, the time division multiplex signal may be generated by combining two or four or more signals. Further, the number of the time division multiplex signals may be two or four or more.

It is to be understood that the embodiments disclosed herein are exemplary in every point and the embodiments are not restrictive. The technical features described in the respective embodiments can be combined with each other. It is intended that the scope of the present invention includes all modifications or alterations within a range of claims and all ranges equivalent to claims.

What is claimed is:

1. A droplet discharging apparatus comprising:

a nozzle configured to discharge a liquid by an energy generating element;

a first signal generator configured to generate, based on at least first data representing a first driving waveform and second data representing a second driving waveform different from the first driving waveform, a first time division multiplex signal in which a third portion being a part of the second driving waveform is aligned between a first portion being a part of the first driving waveform and a second portion being other part of the first driving waveform, and the second portion is aligned between the third portion and a fourth portion being other part of the second driving waveform, the first time division multiplex signal being capable of transmitting the first data and the second data via a first signal line being single signal line;

a first separator configured to separate a first driving waveform signal representing the first driving waveform or a second driving waveform signal representing the second driving waveform from the first time division multiplex signal generated by the first signal generator;

a second signal generator configured to generate, based on at least third data representing a third driving waveform and fourth data representing a fourth driving waveform different from the third driving waveform, a second time division multiplex signal in which a seventh portion being a part of the fourth driving waveform is aligned between a fifth portion being a part of the third driving waveform and a sixth portion being other part of the third driving waveform, and the sixth portion is aligned between the seventh portion and an eighth portion being other part of the fourth driving waveform, the second time division multiplex signal being capable of transmitting the third data and the fourth data via a second signal line being single signal line; and a second separator configured to separate a third driving waveform signal representing the third driving waveform or a fourth driving waveform signal representing the fourth driving waveform from the second time division multiplex signal generated by the second signal generator, wherein:

the energy generating element is driven by the first driving waveform signal or the second driving waveform signal separated by the first separator, or the energy generating element is driven by the third driving waveform signal or the fourth driving waveform signal separated by the second separator; and a waveform of the first time division multiplex signal and a waveform of the second time division multiplex signal are different from each other.

2. The droplet discharging apparatus according to claim 1, wherein:

each of a maximum amplitude of the first driving waveform and a maximum amplitude of the second driving waveform is within a first range on a basis of a first amplitude value;

each of a maximum amplitude of the third driving waveform and a maximum amplitude of the fourth driving waveform is within a second range on a basis of a second amplitude value; and the first amplitude value and the second amplitude value are different from each other.

3. The droplet discharging apparatus according to claim 1, wherein:

a shape of the first driving waveform and a shape of the second driving waveform are similar to each other;

a shape of the third driving waveform and a shape of the fourth driving waveform are similar to each other; and the shape of the first driving waveform and the shape of the second driving waveform are not similar to the shape of the third driving waveform and the shape of the fourth driving waveform.

4. The droplet discharging apparatus according to claim 3, wherein:

each of the first driving waveform and the second driving waveform has a rising portion, a falling portion, and an intermediate portion between the rising portion and the falling portion;

each of the rising portions of the first driving waveform and the second driving waveform appears between a first point of time and a second point of time;

each of the intermediate portions of the first driving waveform and the second driving waveform appears between a second point of time and a third point of time;

each of the falling portions of the first driving waveform and the second driving waveform appears between a third point of time and a fourth point of time;

the second point of time is later than the first point of time, the third point of time is later than the second point of time, and the fourth point of time is later than the third point of time;

each of the third driving waveform and the fourth driving waveform has a rising portion, a falling portion, and an intermediate portion between the rising portion and the falling portion;

each of the rising portions of the third driving waveform and the fourth driving waveform appears between a fifth point of time and a sixth point of time;

each of the intermediate portions of the third driving waveform and the fourth driving waveform appears between a sixth point of time and a seventh point of time;

each of the falling portions of the third driving waveform and the fourth driving waveform appears between a seventh point of time and an eighth point of time;

the sixth point of time is later than the fifth point of time, the seventh point of time is later than the sixth point of time, and the eighth point of time is later than the seventh point of time; and a length between the first point of time and the second point of time is different from a length between the fifth point of time and the sixth point of time, a length between the second point of time and the third point of time is different from a length between the sixth point of time and the seventh point of time, or a length between the third point of time and the fourth point of time is different from a length between the seventh point of time and the eighth point of time.

5. The droplet discharging apparatus according to claim 3, wherein:

each of inclinations of the first driving waveform and the second driving waveform is within a third range on a basis of a first inclination value;

each of inclinations of the third driving waveform and the fourth driving waveform is within a fourth range on a basis of a second inclination value; and the first inclination value is different from the second inclination value.

6. The droplet discharging apparatus according to claim 5, wherein:

each of the first driving waveform, the second driving waveform, the third driving waveform, and the fourth driving waveform has a rising portion and a falling portion; and each of the inclinations of the first driving waveform, the second driving waveform, the third driving waveform, and the fourth driving waveform is an inclination provided at the rising portion or the falling portion.

7. The droplet discharging apparatus according to claim 3, wherein:

the first time division multiplex signal is configured based on a plurality of data representing a plurality of driving waveforms, respectively, the plurality of driving waveforms including the first driving waveform and the second driving waveform;

the second time division multiplex signal is configured based on a plurality of data representing a plurality of driving waveforms, respectively, the plurality of driving waveforms including the third driving waveform and the fourth driving waveform;

a mean square error relating to amplitudes of the plurality of driving waveforms of the first time division multiplex signal, is smaller than a threshold value; and a mean square error relating to amplitudes of the plurality of driving waveforms of the second time division multiplex signal, is smaller than the threshold value.

8. The droplet discharging apparatus according to claim 1, wherein:

the nozzle includes a first nozzle and a second nozzle;

each of the first data, the second data, the third data, and the fourth data has a plurality of data values which is quantized;

the first signal generator includes:

a first memory; and a first digital-analog converter configured to convert the plurality of data values of the first data and the second data stored by the first memory into an analog signal;

the second signal generator includes:

a second memory; and a second digital-analog converter configured to convert the plurality of data values of the third data and the fourth data stored by the second memory into an analog signal;

the first separator is configured to receive the analog signal inputted from the first digital-analog converter, the first separator including a first switch corresponding to the first nozzle and a second switch corresponding to the second nozzle; and the second separator is configured to receive the analog signal from the second digital-analog converter, the second separator including a third switch corresponding to the first nozzle and a fourth switch corresponding to the second nozzle.

9. The droplet discharging apparatus according to claim 8, further comprising a control circuit configured to:

read the plurality of data values of the first data and the plurality of data values of the second data from the first memory, and output first time division multiplex data, in which the plurality of data values of the first data and the plurality of data values of the second data from the first memory are aligned in time series, to the first digital-analog converter;

read the plurality of data values of the third data and the plurality of data values of the fourth data from the second memory, and output second time division multiplex data, in which the plurality of data values of the first data and the plurality of data values of the second data from the second memory are aligned in time series, to the second digital-analog converter;

input, into the first switch and the third switch, a first selection signal configured to select any one of the first switch and the third switch, and a first synchronization signal configured to indicate an opening-closing timing of a selected one of the first switch and the third switch; and input, into the second switch and the fourth switch, a second selection signal configured to select any one of the second switch and the fourth switch and a second synchronization signal configured to indicate an opening-closing timing of a selected one of the second switch and the fourth switch; wherein the first digital-analog converter is configured to convert the first time division multiplex data outputted from the control circuit into an analog signal to generate the first time division multiplex signal, and configured to output the first time division multiplex signal to the first separator;

the second digital-analog converter is configured to convert the second time division multiplex data outputted from the control circuit into an analog signal to generate the second time division multiplex signal, and configured to output the second time division multiplex signal to the second separator;

based on the first selection signal and the first synchronization signal outputted from the control circuit, the first switch is configured to open and close to separate the first driving waveform signal or the second driving waveform signal from the first time division multiplex signal outputted from the first digital-analog converter or the third switch is configured to open and close to separate the third driving waveform signal or the fourth driving waveform signal from the second time division multiplex signal outputted from the second digital-analog converter; and based on the second selection signal and the second synchronization signal outputted from the control circuit, the second switch is configured to open and close to separate the first driving waveform signal or the second driving waveform signal from the first time division multiplex signal outputted from the first digital-analog converter or the fourth switch is configured to open and close to separate the third driving waveform signal or the fourth driving waveform signal from the second time division multiplex signal outputted from the second digital-analog converter.

10. A head control method for a head having a first nozzle and a second nozzle, comprising:

reading, from a first memory, a plurality of first data values which is quantized and which is included in first data representing a first driving waveform and a plurality of second data values which is quantized and which is included in second data representing a second driving waveform different from the first driving waveform, and outputting first time division multiplex data in which the first data values and the second data values read from the first memory are aligned in time series, to a first digital-analog converter;

converting the first time division multiplex data into an analog signal to generate a first time division multiplex signal, and outputting the first time division multiplex signal to a first switch and a second switch corresponding to the first nozzle;

reading, from a second memory, a plurality of third data values which is quantized and which is included in third data representing a third driving waveform and a plurality of fourth data values which is quantized and which is included in fourth data representing a fourth driving waveform different from the third driving waveform, and outputting second time division multiplex data in which the third data values and the fourth data values read from the second memory are aligned in time series, to a second digital-analog converter;

converting the second time division multiplex data into an analog signal to generate a second time division multiplex signal, and outputting the second time division multiplex signal to a third switch and a fourth switch corresponding to the second nozzle;

outputting, to the first switch and the third switch, a first selection signal configured to select any one of the first switch and the third switch and a first synchronization signal configured to indicate an opening-closing timing of a selected one of the first switch and the third switch;

outputting, to the second switch and the fourth switch, a second selection signal configured to select any one of the second switch and the fourth switch and a second synchronization signal configured to indicate an opening-closing timing of a selected one of the second switch and the fourth switch;

based on the first selection signal and the first synchronization signal, opening and closing the first switch to separate a first driving waveform signal representing the first driving waveform or a second driving waveform signal representing the second driving waveform from the first time division multiplex signal outputted from the first digital-analog converter or opening and closing the third switch to separate a third driving waveform signal representing the third driving waveform or a fourth driving waveform signal representing the fourth driving waveform from the second time division multiplex signal outputted from the second digital-analog converter; and based on the second selection signal and the second synchronization signal, opening and closing the second switch to separate the first driving waveform signal or the second driving waveform signal from the first time division multiplex signal outputted from the first digital-analog converter or opening and closing the fourth switch to separate the third driving waveform signal or the fourth driving waveform signal from the second time division multiplex signal outputted from the second digital-analog converter.

11. A head controller for a head including a nozzle configured to discharge a liquid by an energy generating element, a first separator and a second separator, the head controller comprising:

a first signal generator configured to generate, based on at least first data representing a first driving waveform and second data representing a second driving waveform different from the first driving waveform, a first time division multiplex signal in which a third portion being a part of the second driving waveform is aligned between a first portion being a part of the first driving waveform and a second portion being other part of the first driving waveform, and the second portion is aligned between the third portion and a fourth portion being other part of the second driving waveform, the first time division multiplex signal being capable of transmitting the first data and the second data via a first signal line being single signal line; and a second signal generator configured to generate, based on at least third data representing a third driving waveform and fourth data representing a fourth driving waveform different from the third driving waveform, a second time division multiplex signal in which a seventh portion being a part of the fourth driving waveform is aligned between a fifth portion being a part of the third driving waveform and a sixth portion being other part of the third driving waveform, and the sixth portion is aligned between the seventh portion and an eighth portion being other part of the fourth driving waveform, the second time division multiplex signal being capable of transmitting the third data and the fourth data via a second signal line being single signal line, wherein the first separator is configured to separate a first driving waveform signal representing the first driving waveform or a second driving waveform signal representing the second driving waveform from the first time division multiplex signal generated by the first signal generator;

the second separator is configured to separate a third driving waveform signal representing the third driving waveform or a fourth driving waveform signal representing the fourth driving waveform from the second time division multiplex signal generated by the second signal generator;

the energy generating element is driven by the first driving waveform signal or the second driving waveform signal separated by the first separator, or the energy generating element is driven by the third driving waveform signal or the fourth driving waveform signal separated by the second separator; and a waveform of the first time division multiplex signal and a waveform of the second time division multiplex signal are different from each other.

* * * * *